(12) United States Patent
Adler

(10) Patent No.: US 11,850,729 B2
(45) Date of Patent: Dec. 26, 2023

(54) SYSTEM AND METHOD FOR AUTOMATED EXPERIMENTATION

(71) Applicant: Spaero Inc., San Francisco, CA (US)

(72) Inventor: Mitchell Adler, San Francisco, CA (US)

(73) Assignee: Spaero Inc., San Francisco, CA (US)

( * ) Notice: Subject to any disclaimer, the term of this patent is extended or adjusted under 35 U.S.C. 154(b) by 0 days.

(21) Appl. No.: 18/111,366

(22) Filed: Feb. 17, 2023

(65) Prior Publication Data
US 2023/0271331 A1    Aug. 31, 2023

Related U.S. Application Data

(60) Provisional application No. 63/311,343, filed on Feb. 17, 2022.

(51) Int. Cl.
*B25J 13/06* (2006.01)
*G05B 19/41* (2006.01)
*G05B 19/4155* (2006.01)

(52) U.S. Cl.
CPC .......... *B25J 13/06* (2013.01); *G05B 19/4155* (2013.01); *G05B 2219/31392* (2013.01); *G05B 2219/50391* (2013.01)

(58) Field of Classification Search
CPC ................. B25J 13/06; G05B 19/4155; G05B 2219/31392; G05B 2219/50391
See application file for complete search history.

(56) References Cited

U.S. PATENT DOCUMENTS

| | | | |
|---|---|---|---|
| 6,746,864 B1 * | 6/2004 | McNeil | G01N 33/5304 356/417 |
| 2007/0184546 A1 * | 8/2007 | Farrelly | G01N 35/04 435/303.1 |
| 2012/0136492 A1 | 5/2012 | Amin et al. | |
| 2018/0217172 A1 * | 8/2018 | Webster | G01N 35/00722 |

OTHER PUBLICATIONS

Gonzalez, Coviello Miguel, "Towards a Theory of Droplet-Mixing Graphs in Microfluidics", UC Riverside Electronic These and Dissertations, Sep. 2019, https://escholarship.org/uc/item/4wb2g5z2.

Mehr, S. Hessam M., et al., "A universal system for digitization and automatic execution of the chemical synthesis literature", Science, Oct. 2, 2020, vol. 370, Issue 6512, pp. 101-108, https://www.science.org/doi/10.1126/science.abc2986.

* cited by examiner

*Primary Examiner* — Kira Nguyen

(74) *Attorney, Agent, or Firm* — Jeffrey Schox; Diana Lin

(57) ABSTRACT

In variants, a method for automated experimentation can include: determining experimental constraints, constructing a computational representation of the experiment, optimizing the computational representation subject to the experimental constraints, determining instructions for a laboratory robot based on the optimized computational representation, and/or any other suitable steps.

12 Claims, 18 Drawing Sheets

S500

SET UP  ● Choose Robot >  ● Position Resources >  ○ Run >

INPUT PLATE 1           PLACE IN BAY: 4

```
    1  2  3  4  5  6  7  8  9  10 11 12
A   ○  ○  ○  ○  ○  ·  ·  ·  ·  ○  ○  ·
B   ●  ●  ●  ●  ●  ●  ●  ●  ●  ●  ●  ●
C   ●  ●  ●  ●  ●  ●  ●  ●  ●  ●  ●  ●
D   ●  ●  ●  ●  ●  ●  ●  ●  ●  ●  ●  ●
E   ●  ●  ●  ●  ●  ●  ●  ●  ●  ●  ●  ●
F   ●  ●  ●  ●  ●  ●  ●  ●  ●  ●  ●  ●
G   ●  ●  ●  ●  ●  ●  ●  ●  ●  ●  ●  ●
H   ●  ●  ●  ●  ●  ●  ●  ●  ●  ●  ●  ●
```

Place Plate 1 in Bay 4:

| 10 | 11 | TRASH |
| 7 | 8 | 9 |
| 4 (Plate 1) | 5 | 6 |
| 1 | 2 | 3 |

Ensure that these elements are in the following wells:

- Compound 1    A1-A5
- Compound 2    A6-A9
- Compound 3    A10-A11
- Compound 4    A12

CANCEL    NEXT STEP

FIGURE 14

SYSTEM AND METHOD FOR AUTOMATED EXPERIMENTATION

CROSS-REFERENCE TO RELATED APPLICATIONS

This application claims the benefit of U.S. Provisional Application No. 63/311,343 filed 17 Feb. 2022, which is incorporated in its entirety by this reference.

TECHNICAL FIELD

This invention relates generally to the laboratory robotics field, and more specifically to a new and useful system and method in the laboratory robotics field.

BRIEF DESCRIPTION OF THE FIGURES

FIG. 14 depicts an illustrative example of a user interface for experiment setup.

DETAILED DESCRIPTION

The following description of the embodiments of the invention is not intended to limit the invention to these embodiments, but rather to enable any person skilled in the art to make and use this invention.

1. Overview

Figure 1:
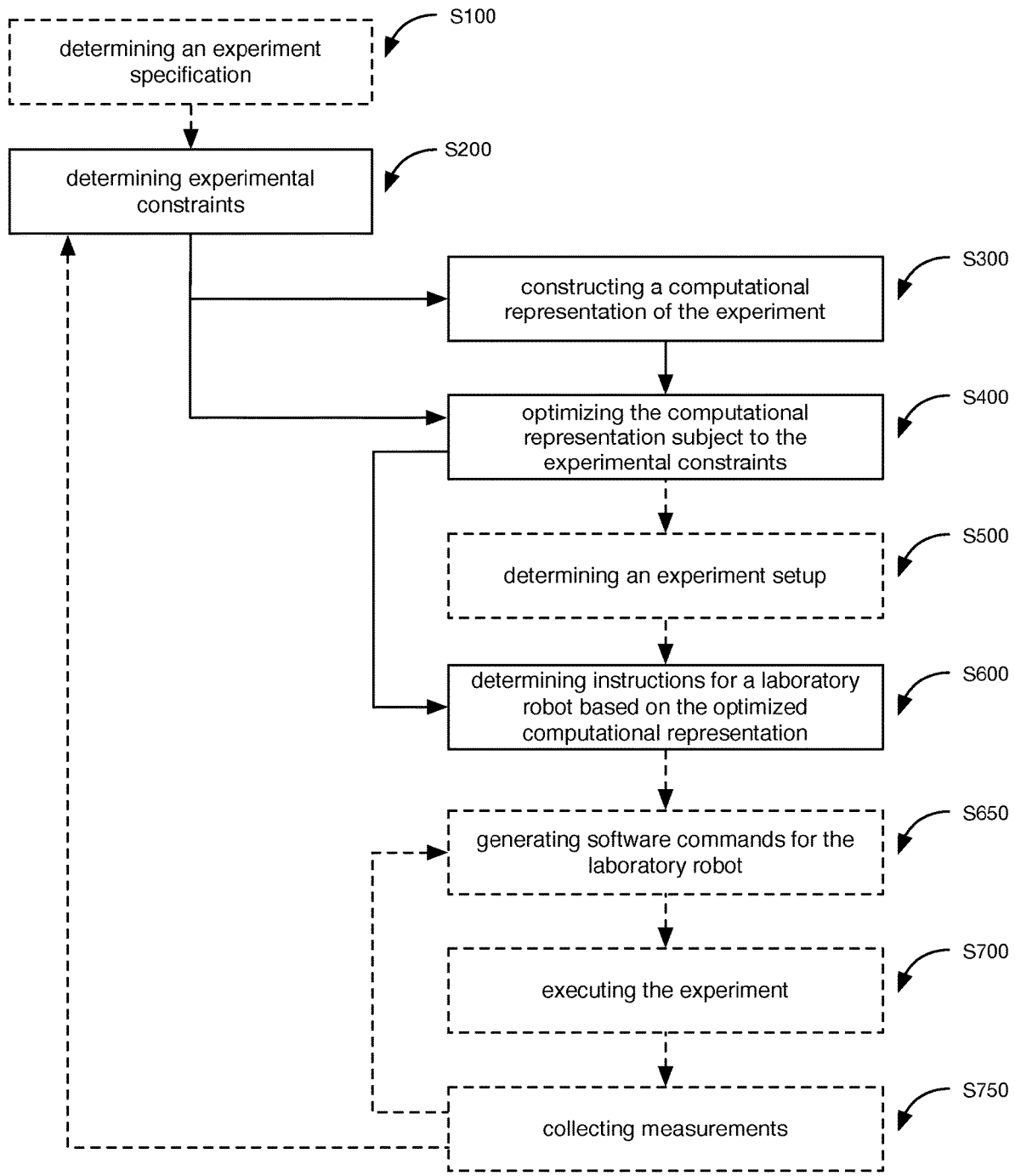
FIG. 1 is a schematic representation of a variant of the method.

As shown in FIG. 1, the method can include: determining experimental constraints S200, constructing a computational representation of the experiment S300, optimizing the computational representation subject to the experimental constraints S400, determining instructions for a laboratory robot based on the optimized computational representation S500, and/or any other suitable steps.

In variants, the method can function to reduce user time spent programming, calibrating, setting up, and/or running experiments using one or more liquid-handling robots (e.g., across multiple liquid handling robot models) and/or other laboratory robots.

2. Examples

In an example, the method can include: receiving an experiment specification from a user (e.g., including reagents and final product concentrations); translating the experiment specification into experimental constraints; determining a directed acyclic graphic (DAG) or other process graph prescribing experimental steps, and optimizing the DAG. Nodes of the DAG can correspond to experiment samples (e.g., liquid, solid, or gaseous samples) and/or specifications thereof (e.g., volume, mass, concentration, location of the sample container, error thereof, etc.). Edges of the DAG can correspond to experiment operations (e.g., liquid transfer, mass transfer, dilution, washing etc.) and/or specifications thereof (e.g., transfer volume, dilution factor, time, error thereof, etc.). In examples, the DAG can be optimized to minimize the number of experiment operations, to minimize error (e.g., pipetting error), and/or a combination thereof. The nodes and/or edges of the DAG can be constrained during optimization based on the experimental constraints (e.g., where specifications for final sample(s) at the leaf node(s) of the DAG are held static), robot constraints (e.g., available operations, error, etc.), and/or other constraints. The optimized DAG (and optionally liquid-handling robot specifications) can be used to determine the experiment setup for a user to implement (e.g., initial volume, concentration, and/or placement of reagents), and to determine instructions for a liquid-handling robot to execute the experimental procedure (e.g., aspirate 1 μL of Reagent A from well #A1). The robot instructions can then be translated into software commands (e.g., including dispensing speed, movement speed, etc.) for the liquid-handling robot. The robot instructions and/or software commands can be determined and/or adjusted based on a liquid characterization model used to determine physical characteristics of a sample present in the experiment.

3. Technical Advantages

Variants of the technology can confer one or more advantages over conventional technologies.

First, programming liquid-handling robots for experiments is time-consuming and requires in-depth programming knowledge for each robot platform (which can be significantly different from one another); this creates a barrier to automated experiment adoption. Variants of this technology provide a no- or low-code programming interface to specify the parameters of an experiment, which the system then automatically translates into robot control motions (e.g., in variants, accounting for liquid physics and physical characteristics), thereby drastically reducing the cognitive overhead for users. In variants, this translation to robot control motions can be performed across a spectrum of laboratory robot models (e.g., liquid handling robot models) produced by different manufacturers, each with different instruction sets and methods of programming.

Second, variants of the technology can provide a unified solution that can interface with a variety of laboratory robots without significant changes to the programming pipeline. This can enable laboratories to implement a uniform system across multiple robotic platforms.

Third, defining an experiment for a robot conventionally requires significant amounts of manual input from the user (e.g., to determine the exact steps the robot should implement, to calibrate the robot for varying reagent properties, etc.). Variants of the technology can automatically optimize the experimental stages, specific robot instructions, and/or system-specific commands, which results in higher experimental throughput. In examples, by representing the experiment and/or substeps thereof as a graph, the system can apply graph-based optimization and transformation methods to quickly determine the number of experiment operations (e.g., number of dilutions), experiment operation parameters (e.g., dilution factors), the volumes of each sample, the concentration of each sample, the lab equipment needed, and/or other experimental parameters (e.g., without additional user input).

Fourth, liquid handling robots inherently have pipetting error, which can cause significant sample concentration error, particularly when performing dilutions using small liquid volumes. Variants of the technology can determine an optimal dilution sequence that minimizes pipetting error, and/or optimizes for a trade-off between minimizing pipetting error, minimizing the number of experiment operations (e.g., minimizing time), minimizing diluent and/or reagent volume used, and/or any other objectives.

Fifth, computational optimization methods applied to liquid handling robot operations can introduce an error difference between target sample compositions and actual manufactured sample compositions due to the discrete (minimum) transfer volume (aspiration/dispensing volume) of the robot. Variants of the technology can convert floating point values to common fractions such that this error difference is below a threshold (e.g., below a detectable threshold, below the pipetting error of the robot, etc.).

Sixth, variants of the technology can increase efficient utilization of a laboratory robot, often a rate limiting step in experiments. In a first example, experiments can include long sequences of steps, each with their own dependencies and time constraints. Variants of the technology can optimize the schedule for each experiment step to ensure efficient laboratory robot operation. In a second example, certain experiment assays are difficult and extremely costly if performed incorrectly, and often require an expert to perform. Variants of the technology provide fully- or semi-automated experimentation, which can increase the accuracy of assays that are sensitive to error, and can enable these assays to be performed without an expert.

However, further advantages can be provided by the system and method disclosed herein.

4. System

Figure 2:
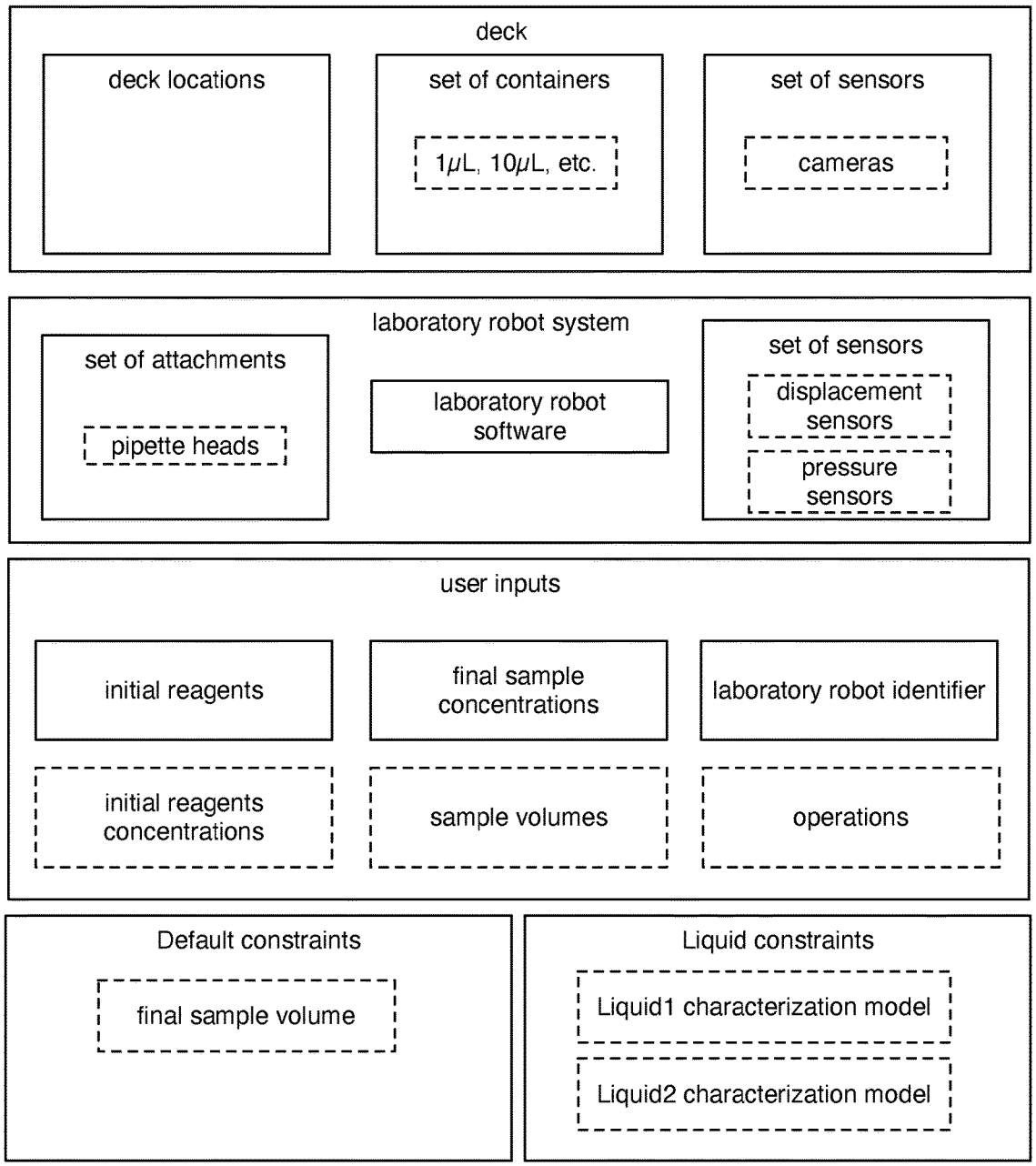
FIG. 2 depicts an embodiment of the system.

The automated experimentation method can be performed using a system including: a laboratory robot system (e.g., a liquid handling robot system), a deck, a user interface, and/or any other suitable components. The system can optionally include one or more models (e.g., an optimization model, a liquid characterization model, etc.), a database, and/or any other suitable components. Examples of system components are shown in FIG. 2.

The laboratory robot system can include a laboratory robot (e.g., a custom robot and/or a third-party robot), an associated software system, a deck, and/or any other suitable components. The laboratory robot system can optionally include measurement systems (e.g., assay tools, sensors, etc.) and/or any other suitable components. The laboratory robot can be a liquid handling robot, a mass transfer robot, an assay robot, and/or any other suitable robot. The laboratory robot can include an end effector and/or end effector attachments (e.g., pipetting heads, pipette tips, graspers, etc.). For example, the laboratory robot can include a single channel pipettor, a multi-channel pipettor, and/or any other pipettor system. The laboratory robot system can perform one or more experiment operations including: diluting samples, transferring samples (e.g., liquids, solids, gels, any mass, etc.), washing samples (e.g., including aspiration and dispensing at equivalent rates), colony picking, moving (e.g., to a new sample, between samples, etc.), collecting measurements (e.g., images, volume, weight and/or mass, force, pressure, temperature, etc.), and/or any other operations. An experiment operation (e.g., experiment step, experiment stage, etc.) can be associated with experiment operation specifications, including: an experiment operation identifier (e.g., 'dilution,' 'mass transfer,' 'washing,' 'mixing', 'wait', etc.), volume (e.g., transfer volume, ratio of transfer volume to total volume at the destination container post-transfer), mass (e.g., transfer mass), dilution factor (e.g., 1%, lox, a volume ratio, etc.), time (e.g., to wait, to incubate, start time, etc.), temperature, laboratory robot movement speed, laboratory robot aspiration rate, position in a sequence of experiment operations, robot instructions to perform the experiment, error (e.g., uncertainty associated with the experiment operation), and/or any other associated information.

The laboratory robot system can optionally be associated with a set of laboratory robot specifications, including: aspiration parameters, actuation parameters (e.g., rate of movement, number of degrees of freedom, origin location, actuation error, etc.), manufacturer information (e.g., make and/or model of the laboratory robot system), number of pipetting channels, pipette tip type (e.g., pipette tip types available to a user and/or that can interface with the laboratory robot system), pipette tip sizes (e.g., pipette tip sizes available to a user and/or that can interface with the laboratory robot system), distance between pipette tips, calibration information, deck specifications, and/or any other specifications. Aspiration parameters can include: aspiration rate, aspiration pressure (e.g., pressure applied by a pipettor drive shaft/plunger), transfer volume (e.g., aspiration volume), valve open/close duration, control signal values (e.g., wherein the control signal drives the aspiration rate, aspiration pressure, etc.), actuation error (e.g., transfer volume error), values thereof (e.g., minimum values, maximum values, target values, calibrated values, etc.), ranges thereof, and/or any other pipetting parameters. In a specific example, aspiration parameters can include a minimum transfer volume (e.g., a minimum transfer volume that satisfies a maximum error constraint, aspirator resolution, etc.) and/or a maximum transfer volume (e.g., maximum volume given a pipette tip size). Aspiration can include positive aspiration and/or negative aspiration (e.g., dispensing). The laboratory robot can additionally or alternatively be associated with a set of limitations or constraints (e.g., determined from or specified within the laboratory robot specification, otherwise determined, etc.), such as motion limitations, pipette limitations, volume limitations, sample material phase limitations (e.g., liquid, solid, viscosity, etc.), supported deck types, well count limitations, and/or other limitations.

The laboratory robot specifications can be retrieved (e.g., from a third-party database, from a system database, etc.), determined based on measurements (e.g., calibration measurements), determined based on user inputs, determined based on sample characteristics (e.g., an aspiration rate parameter determined based on viscosity of a sample), determined based on sample volumes (e.g., pipette tip size selected based on the maximum sample volume that will be aspirated), determined based on information retrieved from a database (e.g., known associations between aspiration parameters and dispensing volumes), and/or otherwise determined. The laboratory robot specifications can optionally be specific to a manufacturer, a make/model, a specific robot, a sample characteristic (e.g., sample type, sample viscosity, etc.), and/or otherwise configured.

The laboratory robot system can include and/or interface with a deck, which functions to hold (physical) containers (e.g., wells, vials, vessels, cuvettes, cartridges, etc.) for experiment samples. The deck (e.g., container carrier, well plate, etc.) can be associated with a set of deck locations (e.g., center location for each container), available containers (e.g., size/volume of containers, container type, etc.), other available labware, and/or any other deck specifications. A deck location can be a set of xyz coordinates (relative to a laboratory robot system origin), a location identifier, and/or otherwise configured. Deck locations (e.g., including deck subvolume locations) can be predetermined (e.g., by the laboratory robot system and/or associated software), retrieved (e.g., from a system database), determined based on measurements (e.g., calibration measurements), determined based on user inputs, determined using a model (e.g., the optimizer model), determined randomly, and/or otherwise determined. Deck subvolume locations (e.g., well locations, vial locations, other container locations, etc.) can be inferred (e.g., based on the deck location), measured, retrieved, predetermined, and/or otherwise determined. Individual deck subvolumes can optionally be associated with an identifier (e.g., a location, an index, a row/column combination, etc.). However, the deck can be otherwise configured.

However, the laboratory robot system can be otherwise defined.

Samples can be liquid, solid, gaseous, and/or have any other state of matter. For example, samples can include solutions (e.g., aqueous and/or non-aqueous solution), organic and/or inorganic matter, gels (e.g., agar), surfactants, solvents, buffers (e.g., wash buffer), acids, bases, biological material, media, salts, diluents (e.g., water) and/or any other substances. Samples can optionally include reagents (e.g., starting reagents) and/or reagent mixtures (e.g., mixtures of multiple reagents, mixtures including water and one or more reagents, etc.). Samples can be single-component samples (e.g., wherein the sample includes a single compound, optionally diluted), multi-component samples, and/or be otherwise configured. For example, a starting reagent can be a starting compound diluted to a starting concentration. Liquid samples can be viscous (e.g., a viscosity between 1 cSt-10,000 cSt) or non-viscous. Samples can be starting samples (e.g., starting reagents), intermediate samples (e.g., samples manufactured or used in service of creating a target sample), target samples (e.g., final samples), and/or any other sample.

A sample can optionally be associated with a set of sample specifications. In examples, the sample specifications can include: an identifier (e.g., the name of the sample, the name of component(s) in the sample, etc.), sample composition (e.g., concentration, volume, mass, etc.), sample characteristics (e.g., viscosity, surface tension, liquid class, rheology profile, adhesion, adsorption, miscibility, molar mass, state of matter, any other sample property, etc.), sample state (e.g., "mixed", "incubated", "washed", etc.), deck location, container (e.g., size, identifier, etc.), and/or any other sample information. In variants, the sample state and/or robot state can be defined by a set of variables. The set of variables can include: physical properties (e.g., viscosity, liquid type, liquid class, rheology, pH, etc.); quantifiable measurements (e.g., volume, concentration, etc.); spatial geometries (e.g., 3D models of wells, well shapes, logical and spatial coordinates of wells, location of each labware instance on the deck or deck layout, location of factors within the labware or plate layout, etc.); temporal variables (e.g., time constraints, such as wait or incubate; robot operation duration; time effect on samples, such as evaporation or temperature change; etc.); biology or chemistry variables (e.g., sterility, temperature, chemical composition, oxygen concentration, $CO_2$ concentration, compound ratios, etc.); operational variables (e.g., distal end of tip position and/or pose, tip type, touch tip, blowout, offsets, etc.); and/or other variables. The sample state (e.g., variable values) can be changed (e.g., from $S_i$ to $S_{i+1}$) by a set of operations or transformations, such as mixing, transferring, stirring, shaking, and/or other transformations. The variable values can be constrained, wherein the set of intermediate states and transformations can be determined by the one or more models in light of the constraints (e.g., using an optimization, by mutating free variables to satisfy the constraints, etc.). In an example, sample concentration can include concentration of each constituent component (e.g., reagent) of the sample. Sample specifications can be retrieved (e.g., from a third-party database, from a system database, etc.), determined based on measurements (e.g., calibration measurements), determined based on user inputs, determined based on other sample specifications, determined based on information retrieved from a database (e.g., known associations between sample identifiers and sample characteristics), determined using a model (e.g., sample composition determined using the optimizer model), and/or otherwise determined.

However, samples can be otherwise defined.

The user interface can function to receive user inputs defining experimental constraints (e.g., prescribing an experiment specification). In specific examples, the user interface can receive inputs including: experiment operation specifications, sample specifications (e.g., target sample compositions, reagents, initial reagent concentrations, etc.), laboratory robot specifications, plate locations, deck locations, variable values (e.g., initial variable values, initial experiment state, etc.), and/or any other inputs. The user interface can optionally include a series of questions posed to the user, wherein user responses (e.g., a selection from a list of options, a manually entered value, etc.) are converted to experiment specifications. In a specific example, initial questions can be at a higher level of granularity relative to subsequent questions. Questions can optionally be determined based on user responses to one or more previous questions. Examples of a user interface are shown in FIG. 12, FIG. 13, FIG. 14, and FIG. 15. However, the user interface can be otherwise configured.

The system can optionally include a database (e.g., local database, remote database such as a cloud database, etc.). In examples, the database can include: measurements (e.g., calibration measurements, experiment results, feedback associated with an experiment operation, other measurements acquired using the laboratory robot system, etc.), laboratory robot specifications, sample specifications, computational representations (e.g., values associated with an optimized computational representation), laboratory robot instructions, laboratory robot software commands, associations thereof, and/or any other information. In a specific example, the database can store experiment method information (e.g., sequence of experiment operations, dilution factors, sample compositions, etc.), experiment result information (e.g., measurements associated with one or more samples), and/or any other information. However, the database can be otherwise configured.

The system can include one or more models, including liquid characterization models, optimization models, error models, constraint-based modeling (e.g, chronological backtracking, constraint propagation, etc.; using constraint programming techniques; etc.), and/or any other model. The models can include or use: regression (e.g., leverage regression), classification, neural networks (e.g., CNN, DNN, CAN, LSTM, RNN, etc.), rules, heuristics, equations (e.g., weighted equations, etc.), selection (e.g., from a library), instance-based methods (e.g., nearest neighbor), regularization methods (e.g., ridge regression), decision trees, Bayesian methods (e.g., Naïve Bayes, Markov, hidden Markov models, etc.), kernel methods, deterministics, genetic programs, encoders (e.g., autoencoders), support vectors, ensemble methods, optimization methods, statistical methods (e.g., probability), comparison methods (e.g., matching, distance metrics, thresholds, etc.), dimensionality reduction, clustering methods, geometric solvers, discretization methods, factorization methods, and/or any other suitable method. Models can use classical or traditional models, machine learning models, and/or be otherwise configured.

Models can be trained, learned, fit, predetermined, and/or can be otherwise determined. Models can be trained using self-supervised learning, semi-supervised learning, supervised learning, unsupervised learning, transfer learning, reinforcement learning, and/or any other suitable training method.

The models can optionally be explained or explainable using methods such as local interpretable model-agnostic explanations (LIME), Shapley Additive explanations (SHAP), t-statistic values, coefficient analyses, by interrogating the resultant experiment plan, and/or other interpretation methods.

The system can optionally include an optimization model, which can function to optimize a computational representation. For example, the optimization model can function to optimize: the geometry of the computational representation, values associated with nodes and/or edges of the computational representation, a mapping between the computational representation and the deck, and/or any other computational representation parameters. In examples, the optimization model can use: geometric solvers (e.g., nonlinear geometric solvers), graph-based optimization methods, constraint programming, propagation, error propagation, genetic algorithms, iterative methods, mixed integer optimization, objective functions, convex and/or non-convex optimization methods, and/or any other models.

Inputs to the optimization model can include: experimental constraints (e.g., experiment specifications, sample specifications, laboratory robot specifications, etc.), an initial computational representation, and/or any other suitable inputs. In a specific example, for a dilution experiment operation, inputs can include an initial computational representation with parameters constrained by target sample compositions, and optionally starting reagent compositions (e.g., starting concentration). In a second specific example, for an experiment including a mass transfer experiment operation, inputs can include a computational representation with parameters constrained by a target mass (to be transferred).

Outputs from the optimization model can include an optimized computational representation and/or any other suitable outputs. In examples, the optimized computational representation includes: node values (e.g., sample specifications such as a sample composition), edge values (e.g., experiment operation specifications), computational representation geometry (e.g., quantity of nodes and edges, position of each node and edge, etc.), a mapping between the computational representation and the deck (e.g., each node is mapped to a container—with an associated deck location—housing a sample associated with the node), traversal sequence, and/or any values for any other parameters. Outputs from the optimization model can optionally include instructions for the laboratory robot (e.g., node/edge traversal sequence for the laboratory robot, sequence of experiment operations performed by the laboratory robot, initial laboratory robot location, etc.), specifications for the laboratory robot (e.g., pipette tip type, pipette tip size, etc.), an initial experiment setup (e.g., starting deck locations of reagents and/or other samples, starting deck locations of containers, starting reagent composition, etc.), and/or any other experiment parameters.

Output values can be continuous, discrete, floating point (e.g., a floating point representation), fractional (e.g., a fraction representation, a common fraction representation), integer (e.g., an integer representation), rational, irrational, rounded (e.g., rounded to an integer, rounded to a common fraction, etc.), a combination thereof, and/or have any other form. In a specific example, the optimization model can optimize the computational representation using floating point representations of values (e.g., without using mixed integer optimization methods), wherein all or a subset of values for the optimized computational representation can be converted to a fractional representation (e.g., a common fraction representation) and/or otherwise transformed.

However, the optimization model can be otherwise configured.

The system can optionally include sample characterization models (e.g., liquid characterization models), which can function to determine (e.g., predict, model, etc.) physical characteristics for a sample and/or determine laboratory robot specifications and/or instructions based on the physical characteristics. The sample is preferably a liquid sample, but can alternatively be a solid or gaseous sample.

Inputs to the sample characterization model can include measurements associated with a sample (e.g., measured using the laboratory robot system and/or otherwise received), known sample characteristics, and/or any other suitable inputs. Outputs from the sample characterization model can include characteristics for a sample, laboratory robot specifications, laboratory robot instructions, and/or any other suitable outputs. In examples, the laboratory robot specification outputs can include: how fast to move the end effector, how long to wait before the end effector is moved, optimal aspiration and/or dispensing speed, optimal aspiration and/or dispensing force, and/or any other specifications or experiment operation instructions.

Each sample characterization model can be associated with one or more samples; and/or each sample can be associated with one or more sample characterization models. Samples (e.g., of one or more liquids, one or more components, etc.), can be modelled using a sample-specific model, or have characteristics calculated using the models of the constituent components (e.g., have a viscosity that is the average of the component viscosities, weighted by volume).

However, the sample characterization model can be otherwise configured.

The system can optionally include a computing system (e.g., a processor), which can include one or more: CPUs, GPUs, custom FPGA/ASICS, microprocessors, servers, cloud computing, and/or any other suitable components. The computing system can be local, remote, distributed, or otherwise arranged relative to any other system or module. In a first example, the computing system includes a robot processing system. In a second example, the computing system includes a separate processing system communicatively connected to the robot processing system (e.g., colocalized or remote from the robot). For example, the computing system can transmit software commands to the laboratory robot system (e.g., batched, streaming, etc.).

However, the method can be performed with any other suitable system.

5. Method

As shown in FIG. 1, the method can include: determining experimental constraints S200, constructing a computational representation of the experiment S300, optimizing the computational representation subject to the experimental constraints S400, determining instructions for a laboratory robot based on the optimized computational representation S600, and/or any other suitable steps. The method can optionally include: determining an experiment specification S100, determining an experiment setup S500, generating software commands for the laboratory robot S650, executing the experiment S700, collecting measurements S750, and/or any other suitable steps All or portions of the method can be performed in real time (e.g., responsive to a request), iteratively, concurrently, asynchronously, periodically, and/or at any other suitable time. All or portions of the method can be performed in response to one or more user inputs (e.g., submitting a finalized experiment specification to a user interface, selecting a robot type, confirming experiment setup, etc.) and/or at any other time. All or portions of the method can be performed automatically, manually, semi-automatically, and/or otherwise performed.

All or portions of the method can be performed by one or more components of the system, using a computing system (e.g., a robot processing system, a separate processing system communicatively connected to the robot processing system, a distributed processing system, etc.), using a database (e.g., a system database, a third-party database, etc.), by a user, and/or by any other suitable system.

The method can optionally include determining an experiment specification S100, which can function to define the experiment protocol, experiment start points, and/or experiment endpoints (e.g., target sample compositions). S100 can be performed before S200 and/or at any other time.

In examples, the experiment specification can include: sample specifications (e.g., for starting reagents, for target samples, etc.), experiment operation specifications (e.g., experiment operation identifier; values for volume transfer, dilution factor, wait time, incubation time, incubation temperature, etc.; experiment operation sequence; etc.), and/or any other experiment parameter. The experiment specification can be complete (e.g., values for the entire experiment specification are defined) or incomplete (e.g., values for a subset of the experiment specification are undefined/unknown). In a first specific example, sample compositions can be expressed without a concentration and/or a volume (e.g., where the concentration and/or volume can be determined during computational representation optimization S400). Elements of the experiment specification can be static (e.g., treated as a constraint during S400), modifiable (e.g., can be updated during S400), and/or otherwise configured. For example, an intermediate sample composition can be changed during S400, while the final sample composition remains static.

In a first embodiment, the experiment specification is determined by receiving user inputs via the user interface. In a specific example, the experiment specification includes target sample compositions input by the user. In an illustrative example, the user can specify an experiment operation including mixing two samples (e.g., with given sample compositions) followed by waiting period of 30 min. In a second embodiment, the experiment specification is retrieved from a database (e.g., of common experiment specifications, of past experiment specifications, etc.). In a specific example, a user selects an experiment, and an associated experiment specification is retrieved from a database. In a third embodiment, the experiment specification is predetermined. In a first specific example, target sample compositions are assigned a predetermined volume (e.g., the same volume for each target sample). In a second specific example, a final experiment operation in manufacturing each target sample (e.g., a final volume transfer between a penultimate container and a final container) is assigned a predetermined transfer volume, wherein the predetermined volume can optionally be equal to a minimum transfer volume associated with the laboratory robot. The predetermined transfer volume can be between 0.1 μL-1 mL or any range or value therebetween (e.g., 0.5 μL, 1 μL, 2 μL, etc.), but can alternatively be less than 0.1 μL or greater than 1 mL. In a fourth embodiment, the experiment specification is determined using the optimization model (e.g., via S400). In a fifth embodiment, the experiment specification can be determined using a combination of the previous embodiments. For example, the experiment specification can include target concentrations for one or more target samples and predetermined target volumes for the one or more target samples.

However, the experiment specification can be otherwise determined.

Determining experimental constraints S200 can function to define optimization constraints for: the computational representation (e.g., node parameters, edge parameters, etc.), the experiment setup, the robot instructions, and/or the software commands. S200 can be performed after S100, after S750 (e.g., where S200 includes calculating constraints based on measurements), and/or at any other time.

Experimental constraints can include or be based on: the experiment specification, laboratory robot specifications, sample specifications, experiment operation specifications, computational representation parameters, and/or any other parameters. Experimental constraints can be fixed for an initial computational representation (e.g., where the constraints are not necessarily held constant during optimization) and/or fixed for the final computational representation. The experimental constraints can include hard and/or soft constraints. Examples of constraints can include: binary objectives (e.g., must complete within 2 hours), mathematical relationships (e.g., x+y<z), declaration of valid values (e.g., a range of acceptable values, specific scalar quantities, set of available labware, etc.), a fitness function (e.g., that assigns a score to a given state and allows a user to optimize for a parameter, such as cost, time, or accuracy, etc.); specific fixed values (e.g., specify which tip type to use); step functions or conditionals (e.g., if-then statements, if-else statements, etc.), and/or other constraints.

In a first variant, experimental constraints can be received (e.g., directly from user inputs). For example, a constraint on one or more node/edge parameters of the computational representation can be specified directly by a user (e.g., starting reagent compositions, intermediate and/or final sample compositions, etc.). In a specific example, the experimental constraints can include values received during S100. In a second variant, experimental constraints can be calculated (e.g., based on measurements, sample characterization models, the experiment specification, user inputs, etc.). In a first example, the final sample composition can be calculated by stepping through the experiment specification (e.g., including dilution stages, mixing stages, etc.) to reach the target sample composition. In a second example, liquid handling constraints for a sample (e.g., the maximum pipette aspiration/dispensing speed and/or other aspiration parameters) can be determined using a sample characterization model associated with the sample. In a third variant, experimental constraints can be retrieved from a database. For example, the user can select the laboratory robot manufacturer information via the user interface, and experimental constraints (e.g., available robot operations and/or error associated with the operations) can be retrieved based on the robot manufacturer information. In a fourth variant, experimental constraints can be predetermined. In a first example, the final volume (e.g., for a given reagent, for a final sample, etc.) can be a fixed, predetermined constraint. In a second example, the minimum and/or maximum volume for a given container size and/or experiment operation can be fixed (e.g., to reduce pipetting error).

However, experimental constraints can be otherwise determined.

Constructing a computational representation of the experiment S300 can function to represent experiment operations and/or samples in a graphical format that can be optimized. In an example, the constructed computational representation is an initial condition for optimization in S400. The computational representation preferably represents a single experiment (e.g., associated with an experiment specification from S100), but can alternatively represent multiple experiments (e.g., wherein S400 optimizes multiple parallel experiments). S300 can be performed after S200 and/or any other time.

The computational representation is preferably a graphical computational representation (e.g., directed acyclic graph (DAG), tree, etc.), but can alternatively be a process graph, and/or any other experiment representation. The computational representation can include a set of nodes connected by a set of edges, optionally with values associated with nodes and/or edges. In an example, each edge of the computational representation is associated with specifications for an experiment operation (e.g., experiment operation identifier, experiment operation values such as a dilution factor, etc.), and each node is associated with specifications for a sample (e.g., sample identifier, sample composition, deck location, etc.). The computational representation can be defined by computational representation parameters, including: a computational representation geometry (e.g., quantity of nodes and edges, position of each node and edge, etc.), values for nodes, values for edges, a mapping between the computational representation and the deck (e.g., deck locations or well locations associated with each node), a traversal sequence (e.g., sequence of the experiment operations), and/or any other parameters. Any computational representation parameter can be partially or fully determined based on experimental constraints (e.g., determined via S100 and/or S200 methods), determined using optimization methods (e.g., S400), predetermined, determined randomly, and/or otherwise determined. The computational representation parameters can be complete (e.g., values for all nodes and edges are defined, the geometry is fully defined, etc.) or incomplete (e.g., values for a subset of the computational representation parameters are undefined/unknown). Any computational representation parameter can be static (e.g., treated as a constraint during S400), modifiable (e.g., can be updated during S400), and/or otherwise configured.

Figure 7:
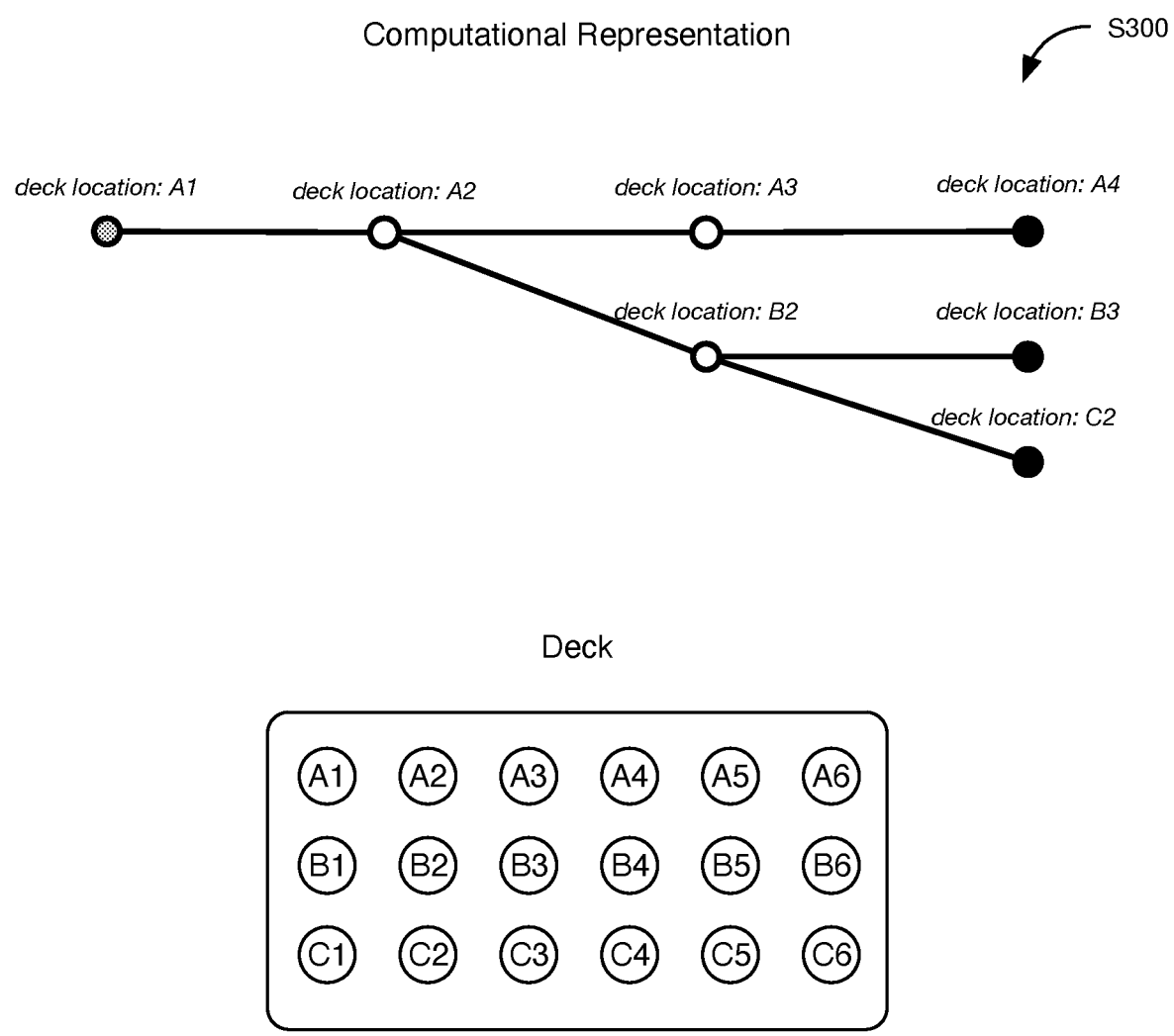
FIG. 7 depicts an illustrative example of a mapping between a computational representation and deck locations.

Nodes of the computational representation can be associated with samples and/or specifications for samples. In an illustrative example, a node can be associated with a sample of 1 mol % Reagent A and 99 mol % Reagent B, and a total sample volume of 5 µL. In another example, each node and associated sample can be mapped to a container. In a specific example, during experiment execution, each sample can be manufactured within (e.g., located within) the associated container, wherein the sample is manufactured to have a sample composition specified by the computational representation. The mapping can optionally be adjusted (e.g., optimized) during or after S400. In a specific example, adjacent nodes in the computational representation can be mapped to adjacent containers on the deck (e.g., adjacent deck locations). An example is shown in FIG. 7.

Nodes can optionally be associated with one or more node identifiers, wherein the node identifiers can function to distinguish between nodes, to represent a computational representation geometry, and/or provide other functions.

Edges of the computational representation can be associated with experiment operations and/or specifications for experiment operations. In specific examples, edges can include: dilution specifications including dilution factors; wait specifications including times; washing specifications including volume of washing buffer; mass transfer specifications including mass; and/or any other experiment operation specifications. For example, an edge connecting a first node to a second node can be associated with a dilution factor. The dilution factor can be of the form $V_1/V_2$, where $V_1$ is the volume transferred from the sample associated with the first node to the sample associated with second node, and $V_2$ is the total volume in the sample associated with second node (e.g., after the individual transfer, after all transfers to the second node sample are complete, etc.). The volumes are preferably integers (e.g., such that the dilution factor is a common fraction including an integer over an integer), but can alternatively be in decimal form (e.g., floating point representations), include irrational numbers, and/or any have other form. The transfer volume to each leaf node container can optionally be a minimum transfer volume associated with the laboratory robot system. In an illustrative example, the volume, $V_f$, of each final sample (associated with leaf nodes of the computational representation) can be determined (e.g., predetermined, user-defined, etc.); the experiment operation specifications for edges immediately prior to these leaf nodes are then $1/V_f$, where each leaf node contains a single droplet (e.g., 1 µL) from the container corresponding to the prior node. A predetermined volume of water or another diluent can optionally be dispensed in leaf node containers prior to dispensing the single droplet.

Figure 8:
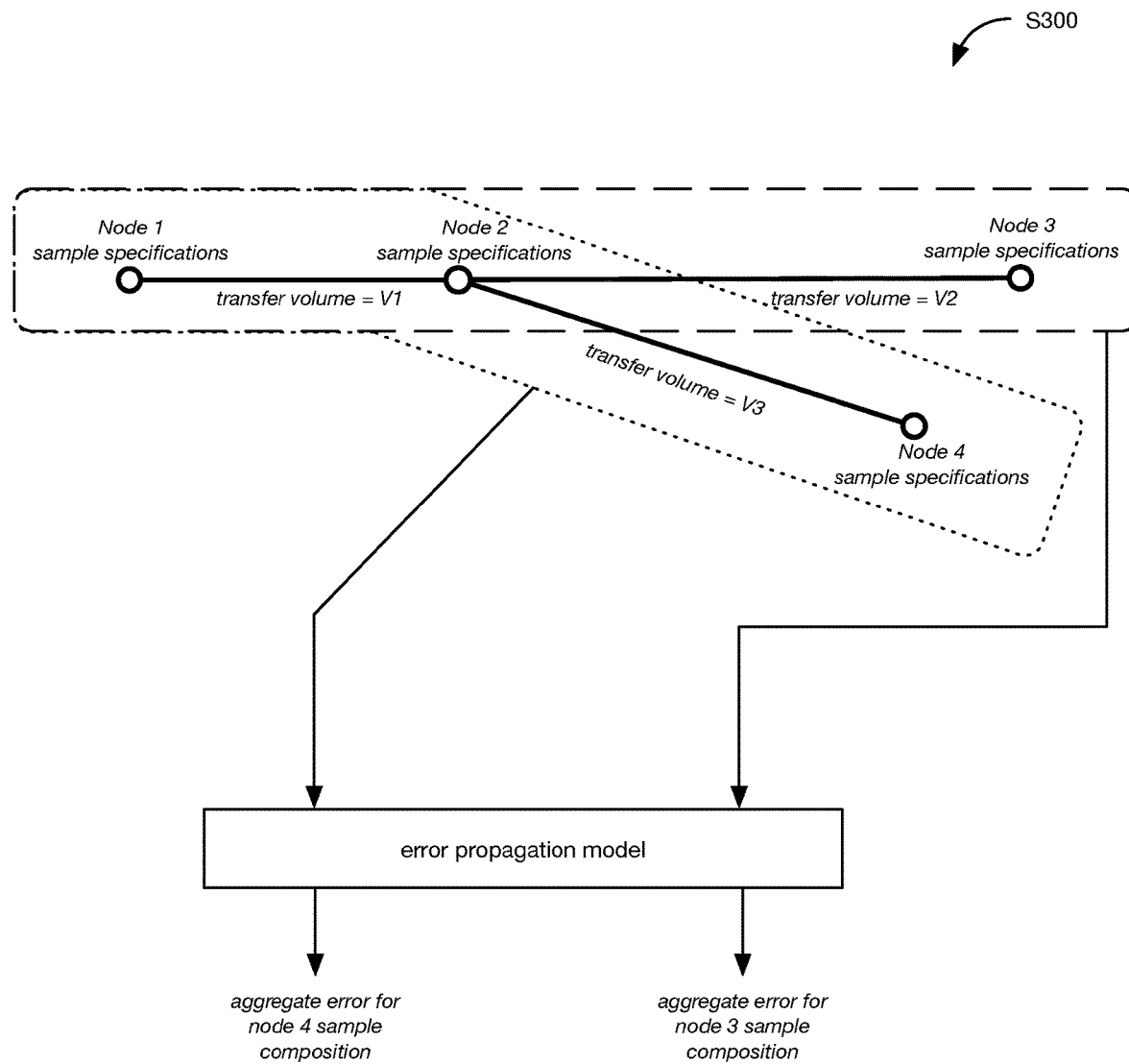
FIG. 8 depicts an example of determining error values for a computational representation.

Nodes and/or edges can optionally be associated with error values (e.g., uncertainty values). Error values can be predetermined, determined using a model (e.g., error aggregation model, error propagation model, etc.), determined using heuristics, determined using algorithms/equations, determined randomly, and/or otherwise determined. In a first variant, error values can be predetermined. For example, each dilution experiment operation can be associated with a predetermined transfer volume uncertainty (e.g., aspiration error, pipetting error, etc.) for the laboratory robot. In a second variant, error values can be determined based on one or more experiment operation specifications. In a first example, transfer volume uncertainty can be determined based on the (target) transfer volume (e.g., a percentage of the total transfer volume). In a second example, transfer volume uncertainty can be determined based on the dilution factor. In a third example, transfer volume uncertainty can be determined based on the pipette tip size (e.g., where each pipette tip size is associated with an uncertainty percentage and/or volume). In a third variant, error values can be determined based on measurements (e.g., calibration measurements). In a fourth variant, error values can be determined based on other error values (e.g., propagating error along the computational representation); an example is shown in FIG. 8. In a first example, an experiment operation error value associated with an edge can be propagated to a sample composition error value associated with a node. In a second example, an experiment operation error value associated with a first edge can be aggregated with an experiment operation error value associated with a second edge (connected to the first edge). In specific examples, error values can be calculated using uncertainty propagation methods, other statistical methods, and/or any other error model. However, error values can be otherwise determined.

S300 can optionally include determining initial (non-optimal) computational representation parameters. For example, the initial computational representation parameters can be selected such that the computational representation completely or partially satisfies the experimental constraints. Initial values for nodes and/or edges can be determined based on experimental constraints (e.g., sample composition constraints), determined based on an initial computational representation geometry (e.g., determined such that the values satisfy the experimental constraints in the initial geometry), determined based on the robot specification (e.g., robot constraints), predetermined, determined, randomly, and/or otherwise determined. In a first example, leaf nodes (representing target samples) can be assigned a target sample composition. In a second example, root nodes (representing starting reagents) can be assigned a partial or complete starting sample composition (e.g., including concentration values with unknown sample volumes). In a third example, sample compositions associated with root nodes and/or intermediate nodes can be unknown.

Values for initial computational representation parameters can be continuous, discrete, floating point, fractional, integer, rational, irrational, rounded (e.g., rounded to an integer, rounded to a common fraction, etc.), a combination thereof, and/or have any other form. In a first specific example, a leaf node can be assigned a common fraction representation of the target sample composition, wherein the common fraction representation can be an approximation of the target sample composition (e.g., a rounded target sample composition). Rounding (e.g., discretizing) the target sample composition can include selecting the common fraction approximation with the smallest denominator such that the difference between the common fraction approximation and the target sample composition is less than a maximum error threshold. The maximum error threshold can be based on error associated with the laboratory robot system (e.g., pipetting error or other laboratory robot noise).

The initial computational representation parameters can include an initial geometry. In a first variant, the initial geometry includes individual (isolated) series of connected nodes from a root node representing a starting reagent to each leaf node representing the target samples. In a second variant, the initial geometry can be determined using factorization (e.g., prime factorization). For example, determining initial computational representation parameters can include determining node identifiers based on prime factors (e.g., common prime factors). In a specific example, an intermediate node along a path from a root node to a leaf node can be assigned a node identifier X, where X is a prime factor of the denominator of a common fraction representation of the leaf node sample concentration. The number of intermediate nodes from the root node to the leaf node can equal the number of prime factors. From the root node to the leaf node, the intermediate node identifiers can proceed in order of decreasing prime factors, in order of decreasing prime factor abundance (e.g., for the individual leaf node, relative to other leaf nodes, etc.), and/or any other order. The root node can optionally be assigned an identifier of 1. Node identifiers can optionally be of the form (X, Y), including a secondary identifier, Y, which functions to differentiate between repeated uses of the same prime factors (e.g., (X, 3) is the third use of prime factor X). In an illustrative example, the path from a root node identifier 1 to a leaf node with sample concentration of 0.7 µM passes through node identifier 2 and node identifier 5 (e.g., the prime factors for the denominator of 7/10). In examples, splitting the DAG at the most abundant prime factor can function to achieve a balanced binary tree and/or provide an initial computational representation geometry that can be optimized (e.g., providing the optimization model with a viable solution). Penultimate nodes prior to the leaf nodes can optionally be transition nodes (e.g., transfer nodes), represent another action, and/or represent any other suitable information.

Figure 3A:
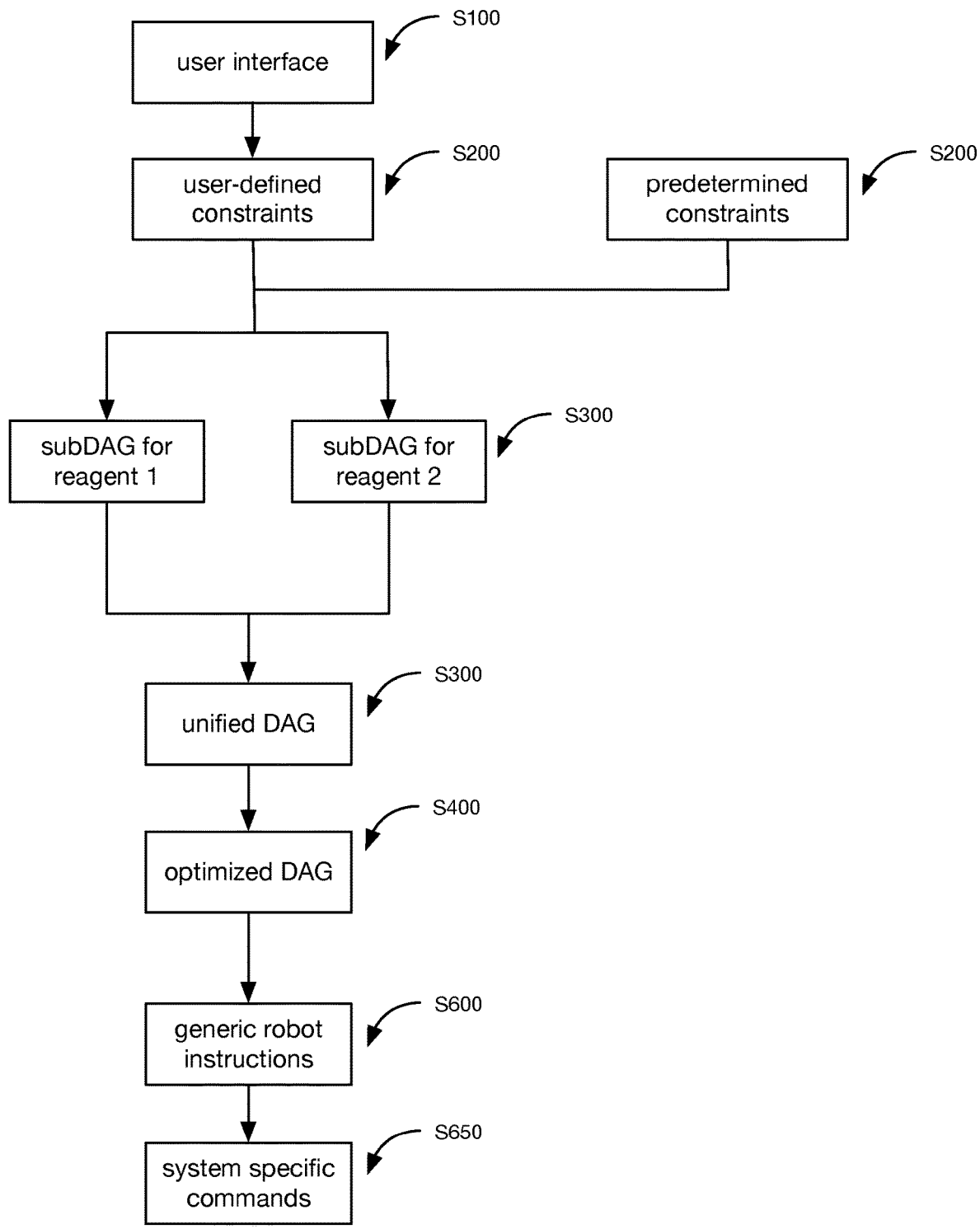
FIG. 3A depicts a first example of the method, including reagent dilution directed acyclic graph subcomponents (sub-DAGs).
Figure 3B:
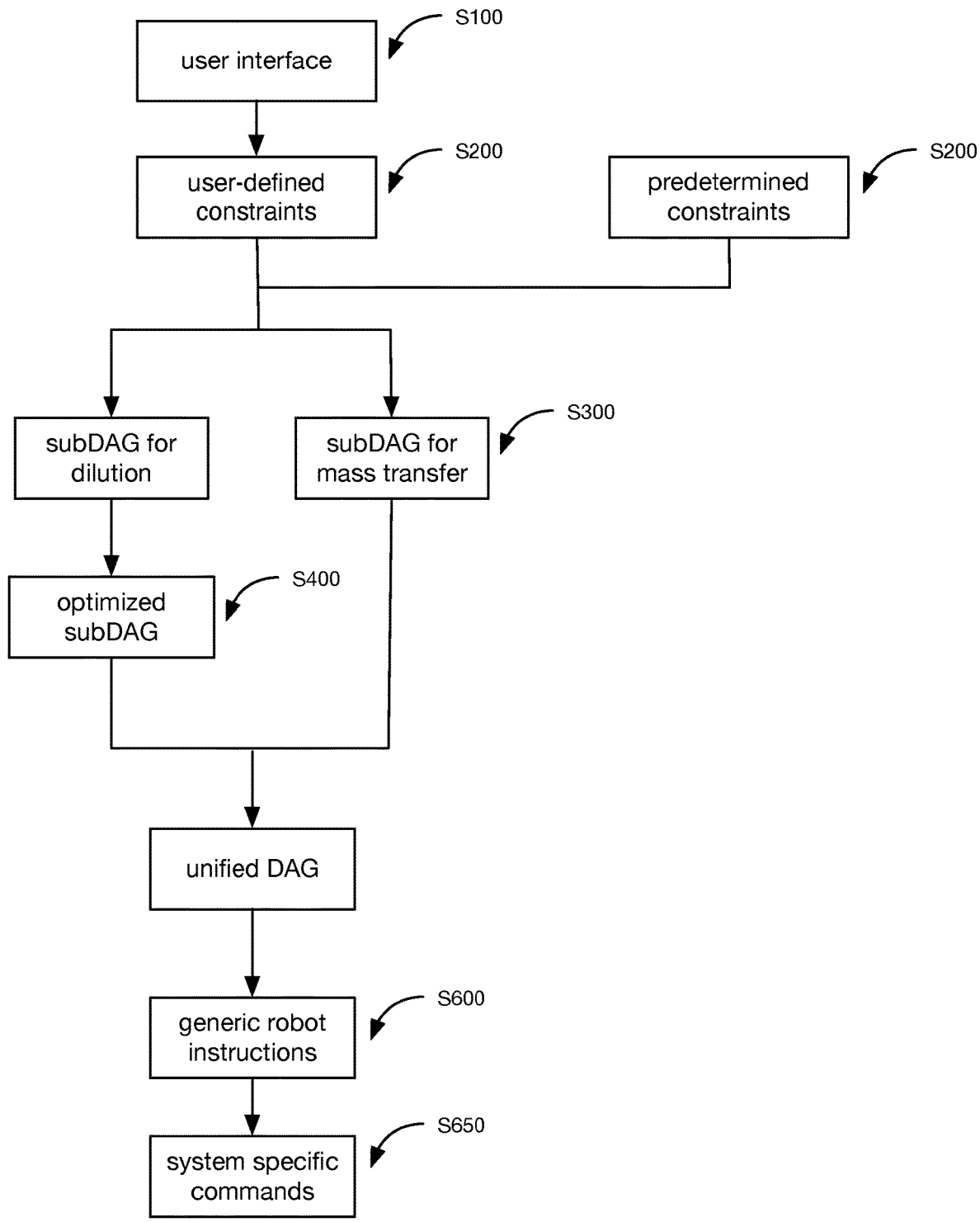
FIG. 3B depicts a second example of the method, including experiment operation directed acyclic graph subcomponents (sub-DAGs).
Figure 9:
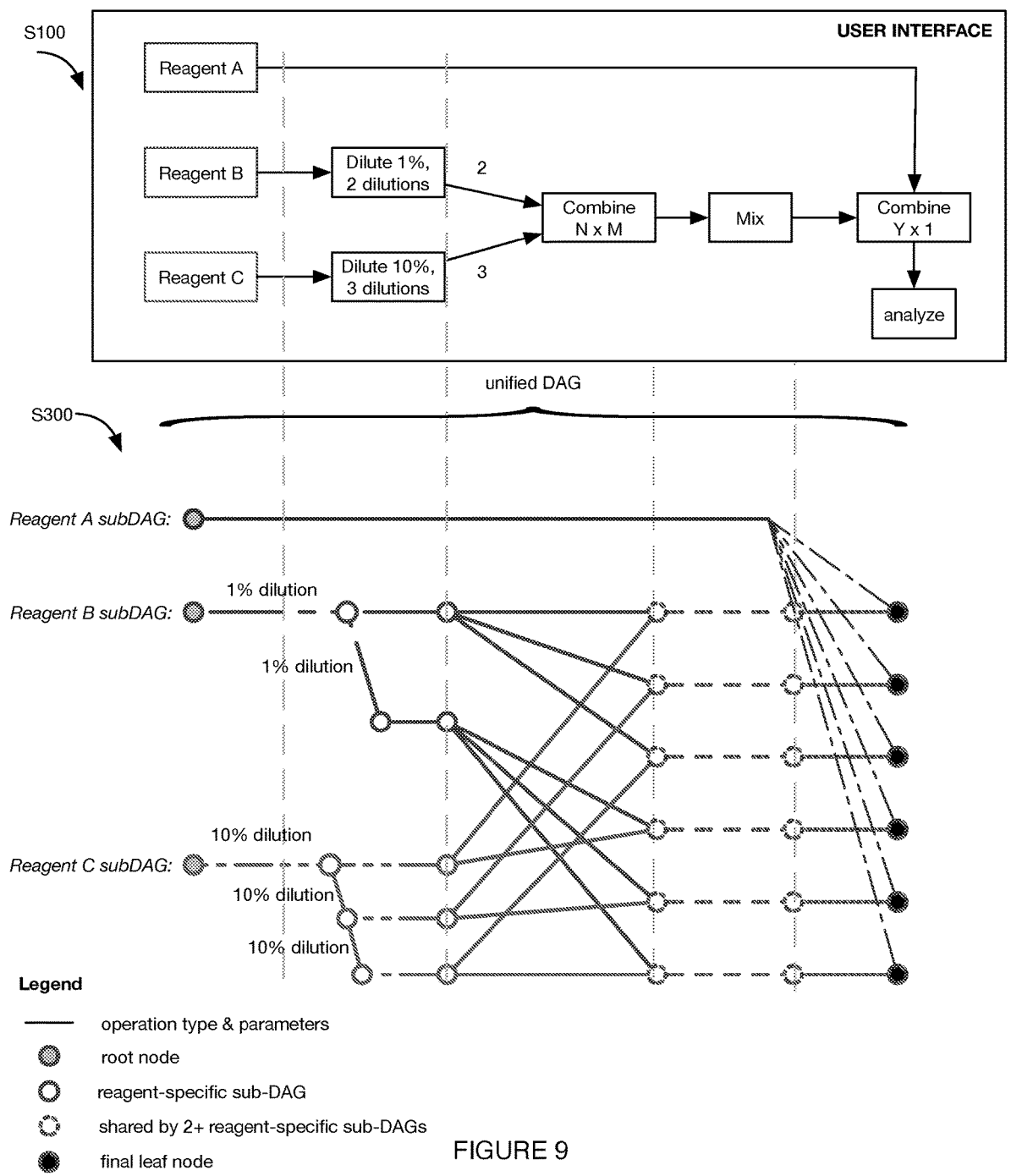
FIG. 9 depicts an illustrative example of constructing a computational representation.

The computational representation can optionally be a DAG including one or more sub-DAGs (e.g., one sub-DAG for each reagent) as subcomponents of a unified DAG, where the unified DAG represents the complete experiment. Sub-DAGs can represent a reagent (e.g., a dilution for a single reagent), an experiment type (e.g., one sub-DAG for dilutions of one or more reagents, one sub-DAG for one or more mass transfers, etc.), and/or any other experiment segment. Examples are shown in FIG. 3A, FIG. 3B, and FIG. 9. For example, for a dilution experiment, each sub-DAG can include a root node representing the initial specifications of a reagent. A leaf node of the sub-DAG (e.g., which can be a leaf node of the unified DAG and/or a component of a leaf node of the unified DAG) can represent specifications for the final state of a reagent in the overall experiment, represent final specifications of the reagent prior to mixing, and/or represent any other terminal state for a given reagent. In a first variant, each sub-DAG extends through to the leaf nodes of the unified DAG, and represents the portions of the unified DAG associated with a given reagent. In a second variant, each sub-DAG only extends through a portion of the unified DAG depth (e.g., the initial layers, until reagent mixing, etc.). The sub-DAGs can be optimized individually (e.g., in parallel, serially, through multiple iterations of S400, etc.), or together (e.g., the unified DAG is optimized in S400). However, the sub-DAGs can be otherwise defined.

In a first example, sub-DAG node specifications for concentration and volume can be treated as unknowns to be determined during optimization in S400 (e.g., with the unified DAG leaf node concentration and/or volume as a fixed constraint). In an illustrative example, the pre-optimization (e.g., naïve) sub-DAG for Reagent A contains a root node with volume $V_1$ and concentration C1, an edge specifying a dilution, and a leaf node with volume $V_2$ (e.g., volume of the container represented by the leaf node) and concentration C2. Post-optimization, the sub-DAG for Reagent A includes a root node with a volume of 1 μL and a concentration of 1 mM, an edge specifying a 1:10 dilution, and a leaf node with a volume of 1 μL (e.g., representing a partial volume or final volume of the corresponding leaf node in a unified DAG) and a concentration of 0.1 mM.

In a second example, the concentrations for root and/or leaf nodes of the sub-DAG can be determined in S200 (e.g., directly determined based on the experimental constraints, calculated based on the constraints, etc.), while the volume remains unknown. In this example, the sub-DAG leaf node concentrations can be treated as a fixed constraint. In this example, the volume can be solved for during the optimization, and/or be otherwise determined. In an illustrative example, the pre-optimization sub-DAG for Reagent A contains a root node with volume $V_1$ and a concentration of 1 mM, an edge specifying a 1:10 dilution, and a leaf node with volume $V_2$ and a concentration of 0.1 mM. Post-optimization, the sub-DAG for Reagent A includes a root node with a volume of 10 μL and a concentration of 1 mM, an edge specifying a 1:10 dilution, and a leaf node with a volume of 1 μL and a concentration of 0.1 mM.

In a third example, the sub-DAG can be initially constructed based on the experiment specification, but nodes defined by the experiment specification can be modified during optimization. In an illustrative example, the pre-optimization sub-DAG for Reagent A contains a root node with volume $V_1$ and a concentration of 1 mM, an edge specifying a 1:10 dilution, and a leaf node with volume $V_2$ and a concentration of 0.1 mM. Post-optimization, the sub-DAG for Reagent A includes a root node with a volume of 0.5 μL and a concentration of 0.5 mM, an edge specifying a 1:5 dilution, and a leaf node with 1 μL and a concentration of 0.1 mM.

The unified DAG can include each sub-DAG (e.g., with leaf nodes of one or more sub-DAGs combined to form a leaf node of the unified DAG) and/or other child DAGs. Alternatively, the unified DAG can exclude sub-DAGs, only use the outputs of sub-DAGs, and/or be otherwise configured. The unified DAG can include one or more final leaf nodes representing specifications for the final state of a sample (e.g., post mixing stages). The final node specifications are preferably determined based on the experimental constraints, but can alternatively be determined during optimization. Multiple leaf nodes from different sub-DAGs can combine to form a leaf node of the unified DAG (e.g., with edges pointing from multiple sub-DAG nodes to the final leaf node, where each edge represents a specified volume transfer).

In a first illustrative example of the unified DAG, a leaf node contains X uMol/L of Reagent A, Y uMol/L of reagent B, and has a total volume of Z uL. The corresponding leaf node for the Reagent A sub-DAG represents that P uL (e.g., where P can be predetermined to equal 1) of Reagent A should be added from the previous node in the sub-DAG (e.g., with concentration X*Z/P uMol/L of Reagent A) to the leaf node for a concentration of X uMol/L of Reagent A. The corresponding leaf node for the Reagent B sub-DAG represents that Q uL (e.g., where Q can be predetermined to equal 1) of Reagent B should be added from the previous node in the sub-DAG (e.g., with concentration Y*Z/Q uMol/L of Reagent B) to the leaf node for a concentration of Y uMol/L of reagent B.

In a second illustrative example of the unified DAG, the pre-optimization DAG contains a parent node for Reagent A with volume $V_1$ and concentration C1, a parent node for Reagent B with volume $V_2$ and concentration C2, an edge from each reagent parent node to a final unified DAG leaf node with Reagent A concentration of 0.01 mM, Reagent B concentration of 1 mM, and total volume 1 μL. Post-optimization, the unified DAG includes a parent node for Reagent A with volume 1 μL, and a concentration of 0.02 mM, a parent node for Reagent B with volume 1 μL, and a concentration of 2 mM, an edge from the Reagent A parent node to the final unified DAG leaf node with a transfer of 0.5 μL, an edge from the Reagent B parent node to the final leaf node with a transfer of 0.5 μL, and a final leaf node with Reagent A concentration of 0.01 mM, and Reagent B concentration of 1 mM, and final volume 1 μL.

However, the computational representation can be otherwise determined.

Optimizing the computational representation subject to the experimental constraints S400 functions to determine the optimal experiment operation specifications, laboratory robot specifications, sample specifications, and/or any other experiment information. S400 can be performed after S300 and/or at any other time.

The computational representation can be optimized to minimize or maximize: user time, laboratory robot time, laboratory robot actions, experiment operations, computational representation parameters (e.g., number of nodes, number of edges, etc.), dilution factors (e.g., push dilution factors to 1 such that edges can be collapsed), laboratory robot error (e.g., pipetting error), computational representation error (e.g., between values in the computational representation and experimental constraints), aggregate error (e.g., propagated laboratory robot error, aggregate of error values associated with edges and/or nodes, etc.), contamination risk, the number of containers located between each pair of containers associated with connected nodes (e.g., minimizing the number of containers the laboratory robot passes over during sample transfers to minimize a sample contamination), dead volume of liquid, reagent volume, diluent volume, deck space utilization, an aggregate of dilution factors (e.g., product of dilution factors associated with each edge), a number of high-error experiment operations (e.g., dilution factors below a threshold, transfer volume below a threshold, etc.), a combination thereof, and/or any other optimization target (e.g., objective). For example, the computational representation can be optimized using multi-objective optimization (e.g., optionally parameterizing and/or weighting multiple optimization targets, using multiple objective functions, etc.).

The computational representation can be optimized using the optimization model, other optimization methods (e.g., graph-based optimization methods), iterative methods, and/or any other suitable method. The computational representation is preferably optimized using convex optimization solvers, but can alternatively include non-convex optimization solvers and/or any other optimization method. For constrained optimization techniques, the constraints can include: structural/geometric constraints (e.g., acyclic constraint, mixing order, edge sequence, etc.), node constraints (e.g., final reagent concentration, final volume, etc.), edge constraints (e.g., maximum transfer volume, minimum transfer volume, transfer volume from penultimate node to leaf nodes), any experimental constraints (e.g., represented as values in the computational representation, used to determine acceptable computational representation parameter values, etc.), and/or any other variable constraints. The constraints used during optimization preferably do not include mixed integer constraints (e.g., for node values, for edge values, etc.), but can alternatively include mixed integer constraints.

In a first variant, a single-stage optimization approach is used. In an example, the computational representation optimization includes optimization of the computational representation (e.g., a unified DAG) to determine sample specifications (e.g., volume and/or concentration) associated with each node and/or to determine experiment operation specifications (e.g., dilution factors) associated with each edge.

Figure 6:
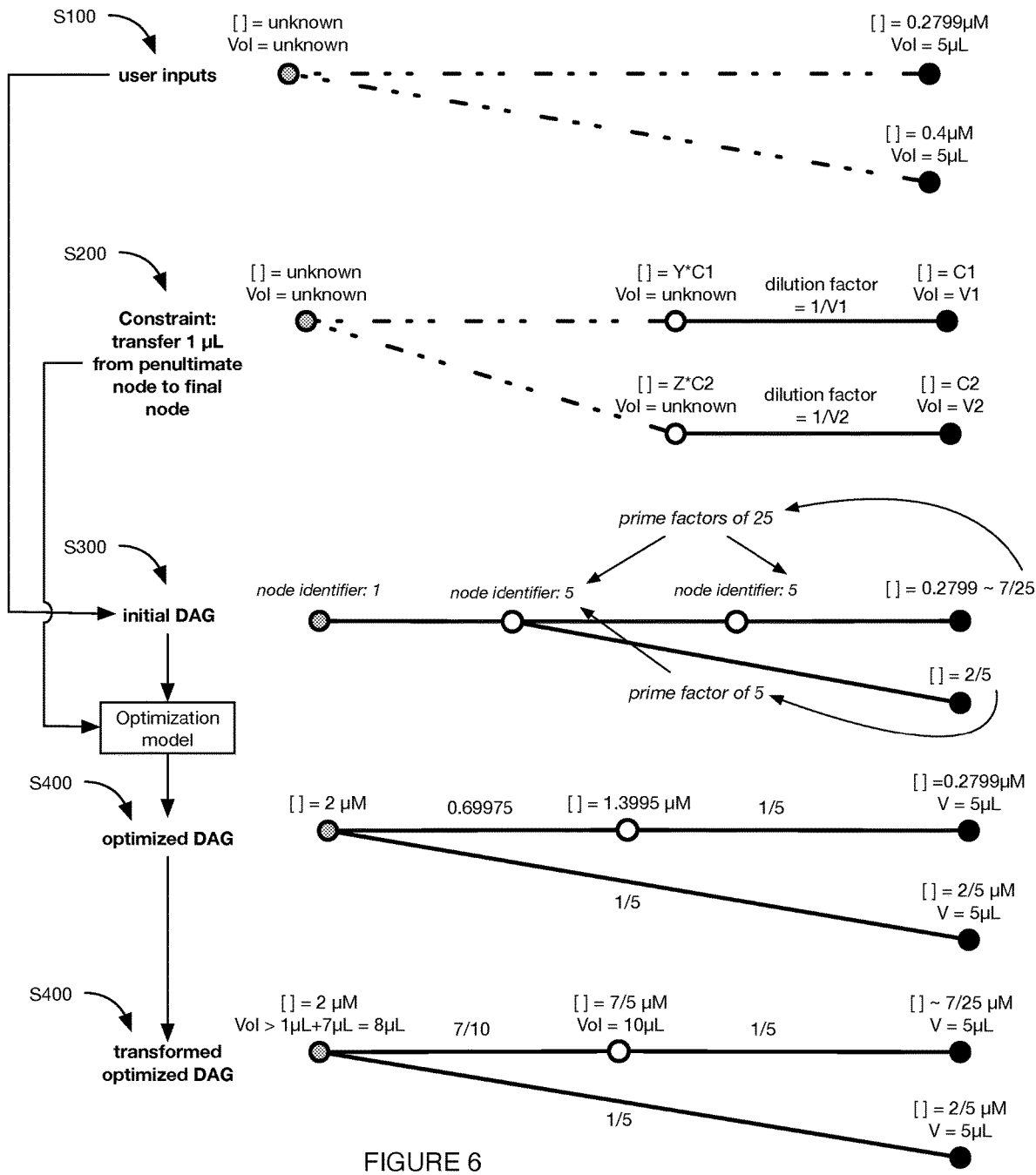
FIG. 6 depicts an illustrative example of optimizing a computational representation.
Figure 10A:
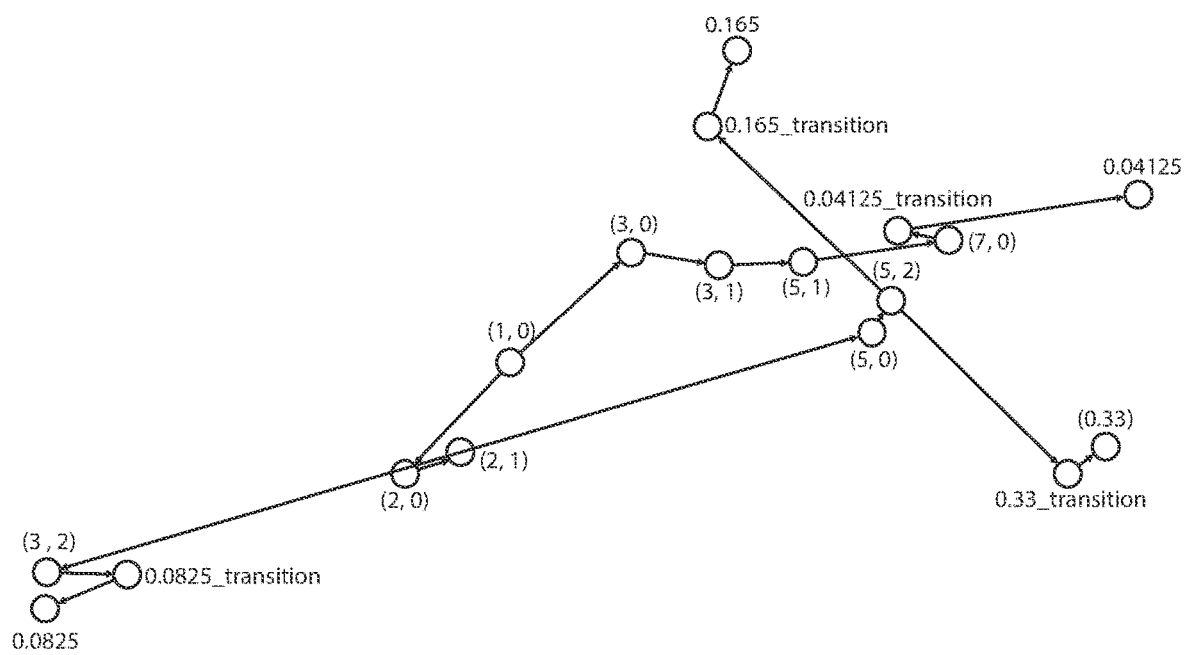
FIGS. 10A and 10B depict a first illustrative example of a computational representation pre-optimization and post-optimization, respectively.
Figure 10B:
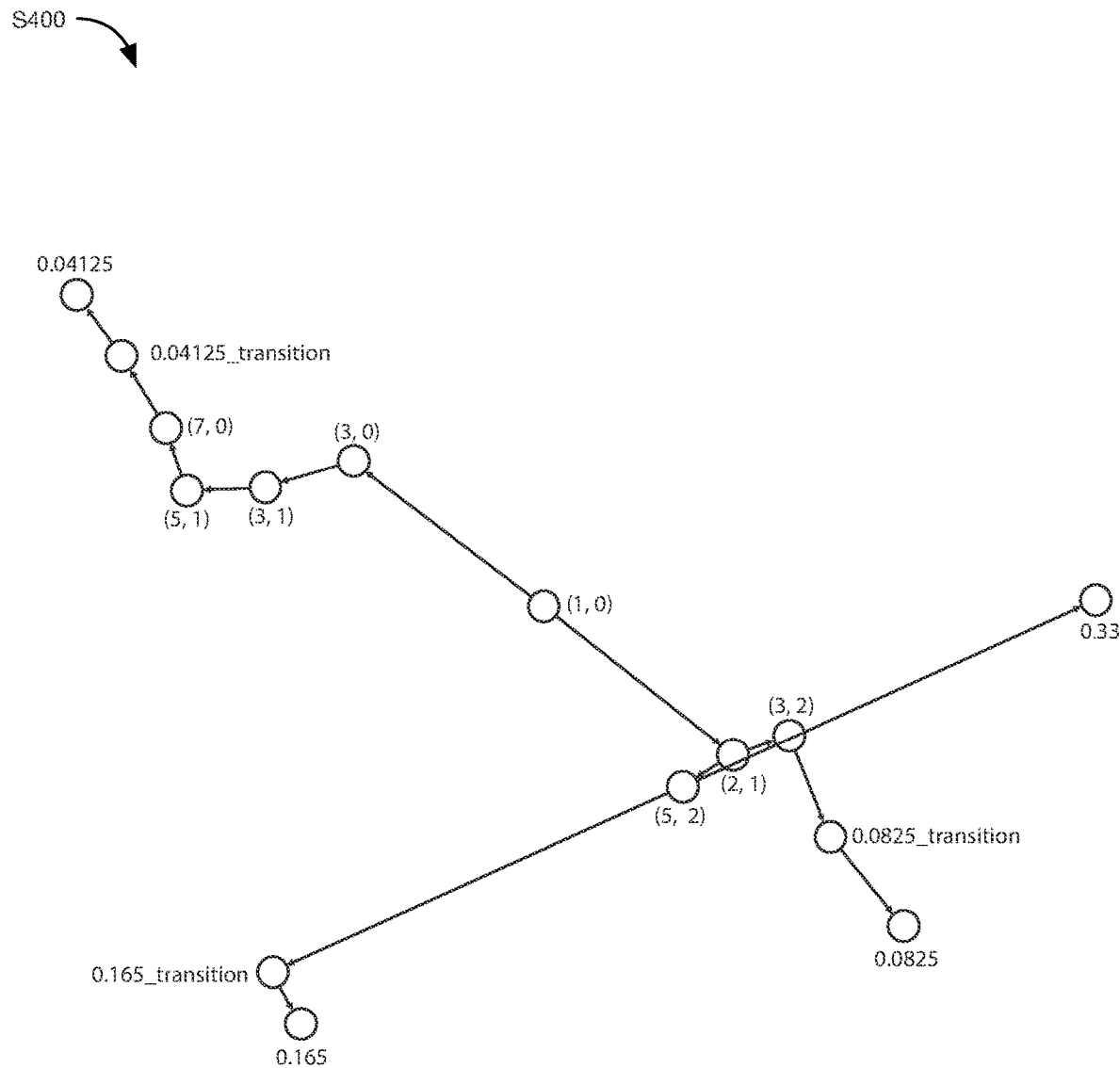
Figure 11A:
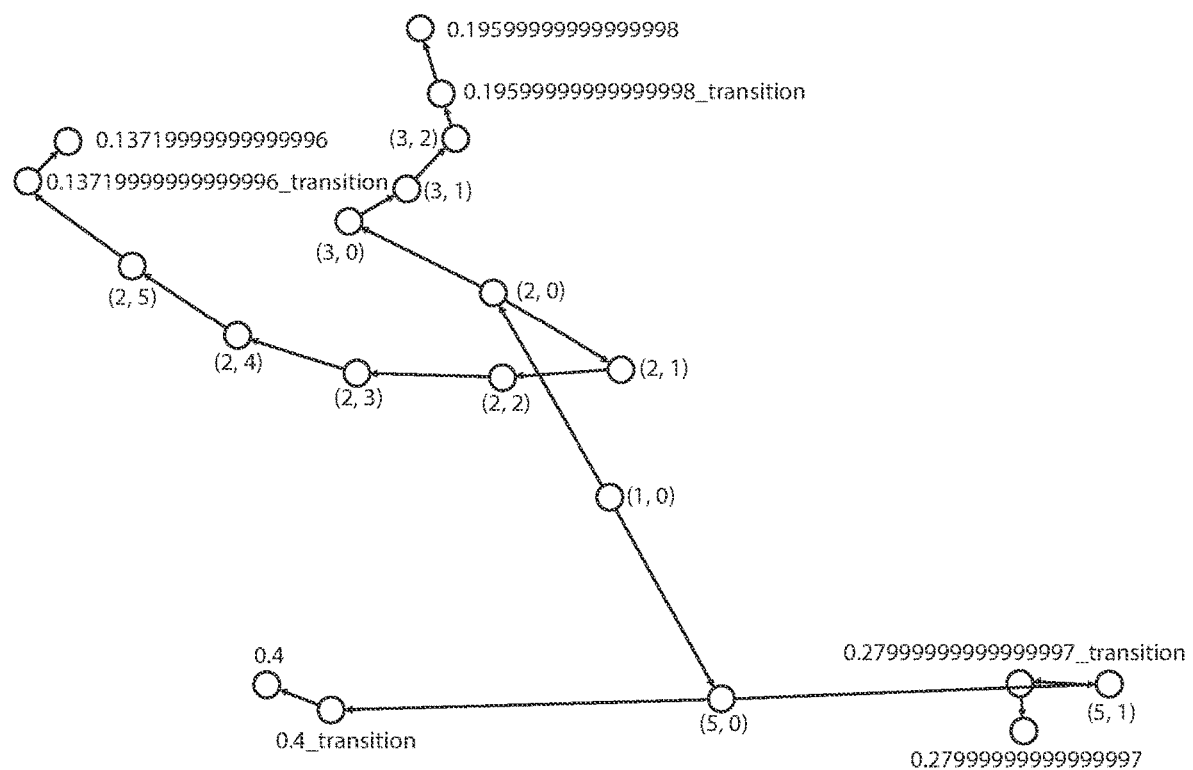
FIGS. 11A and 11B depict a second illustrative example of a computational representation pre-optimization and post-optimization, respectively.
Figure 11B:
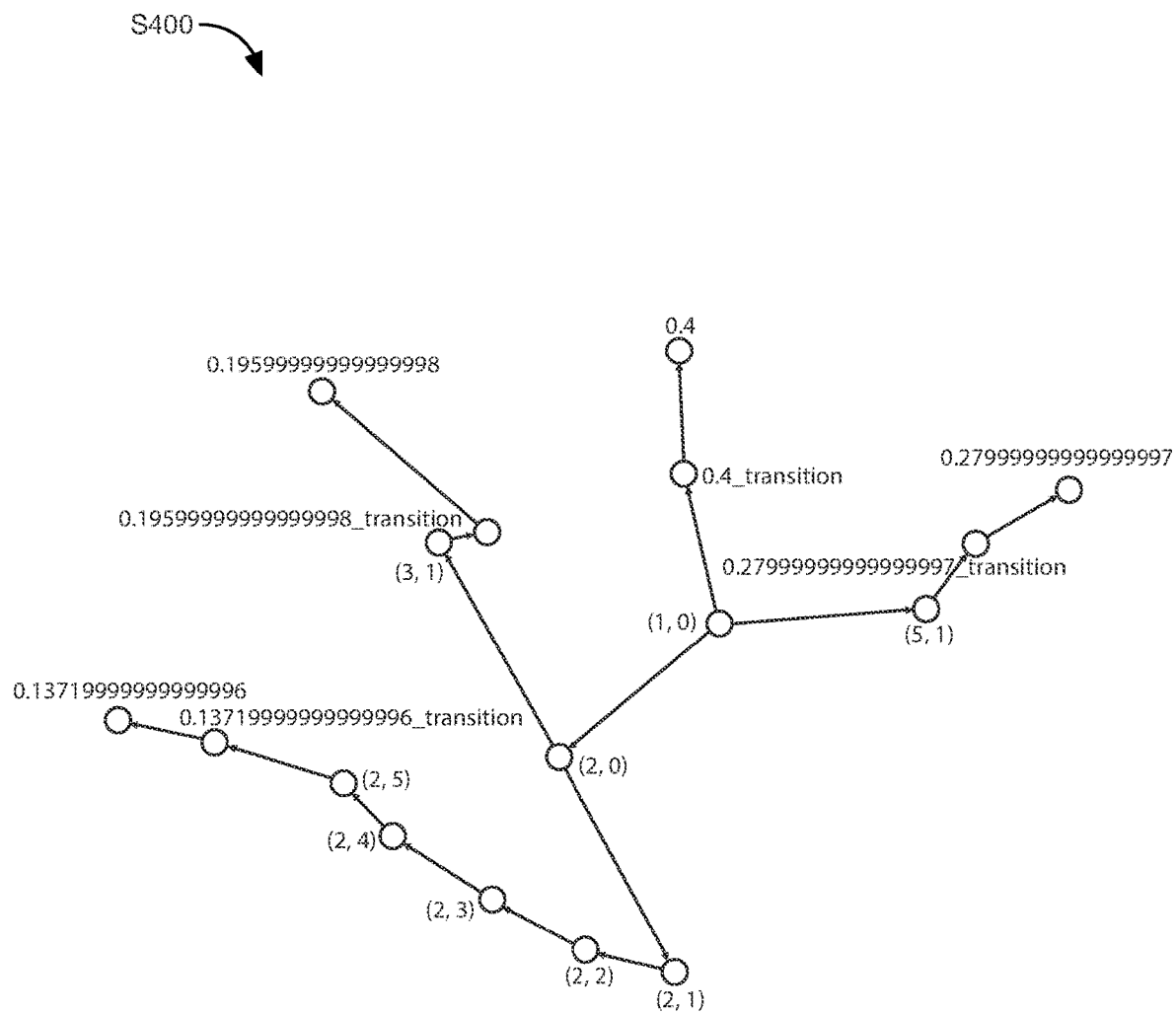
Figure 12:
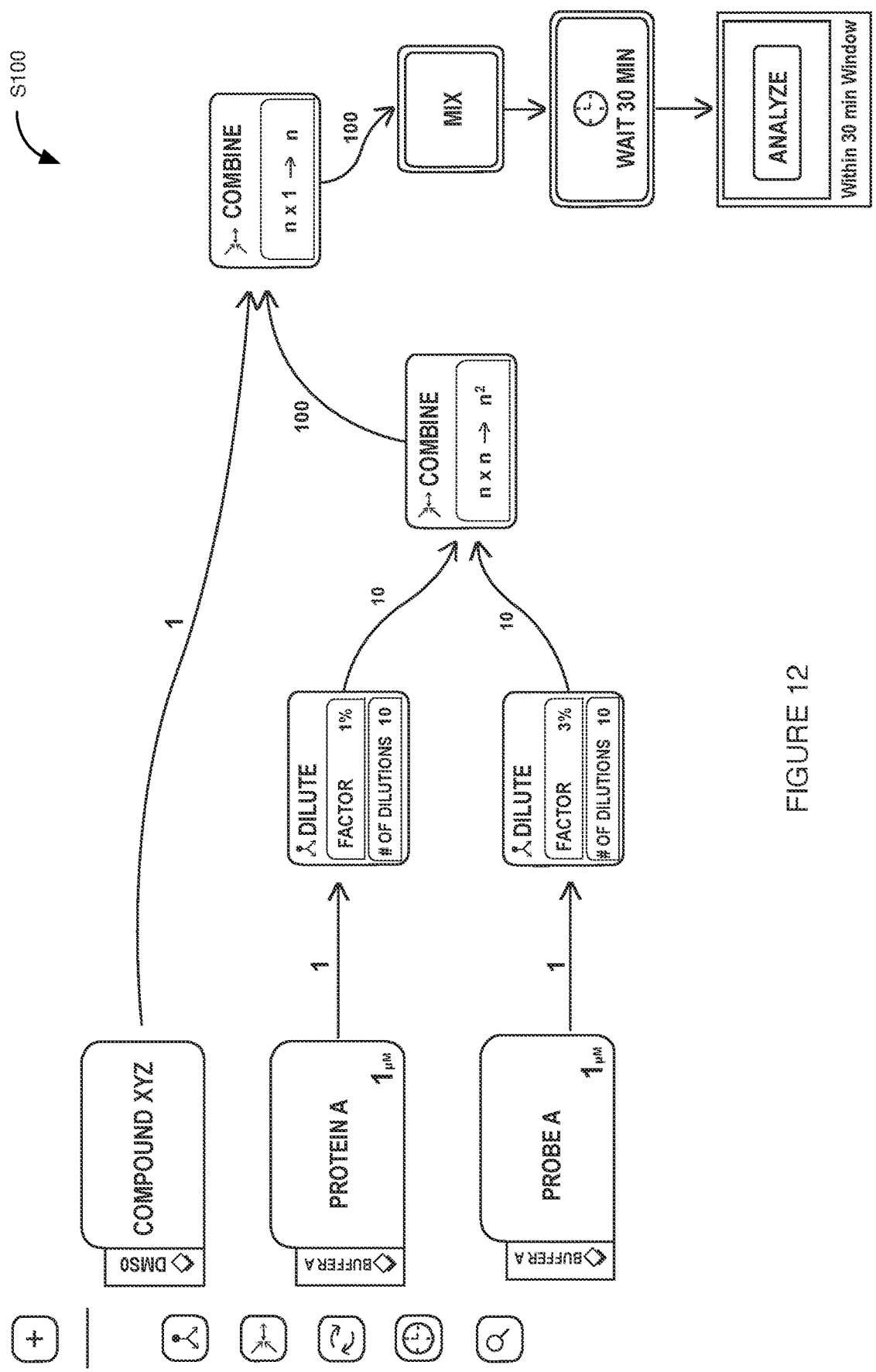
FIG. 12 depicts an illustrative example of a user interface for experiment specification.
Figure 13:
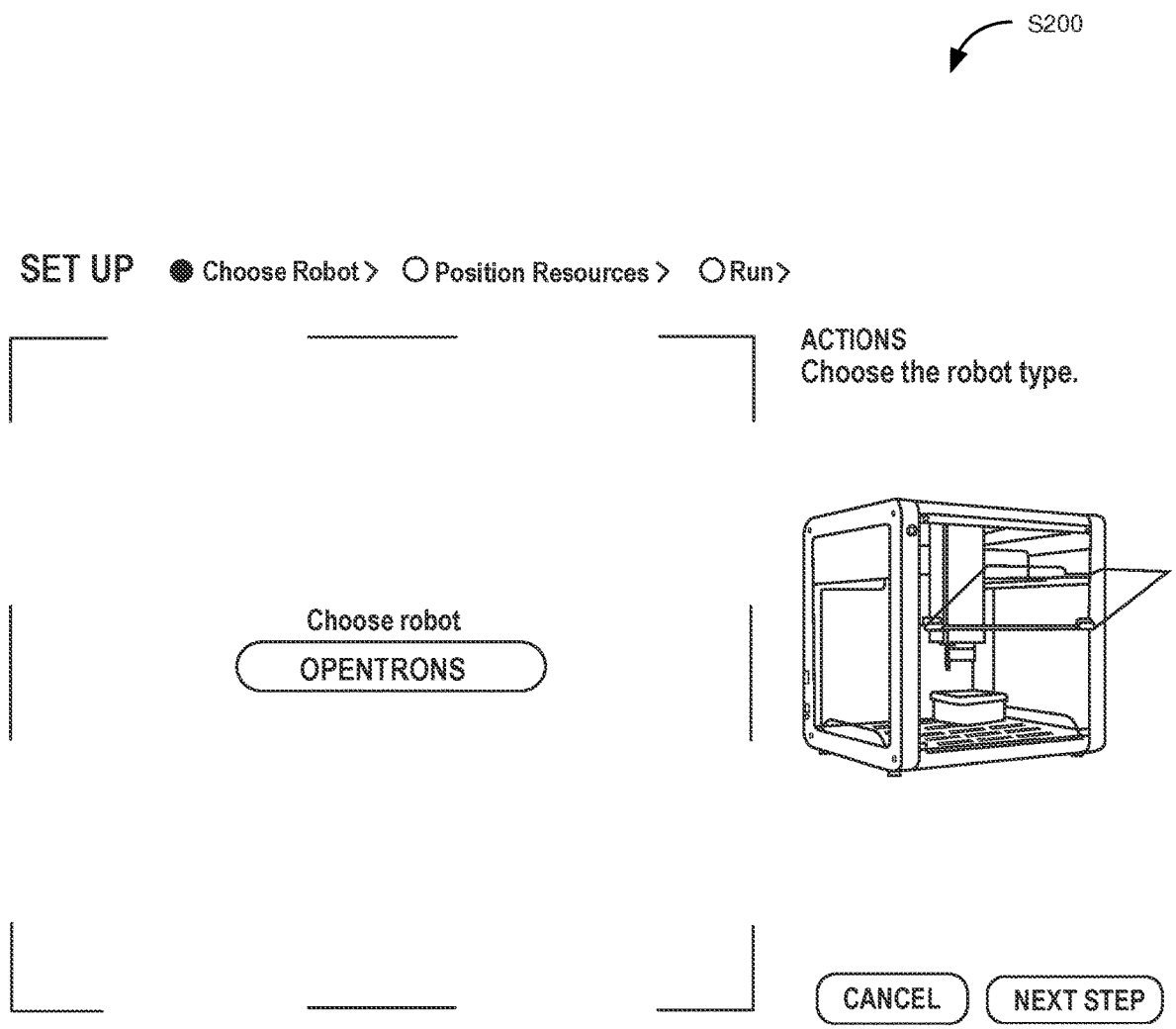
FIG. 13 depicts an illustrative example of a user interface for experimental constraints.
Figure 15:
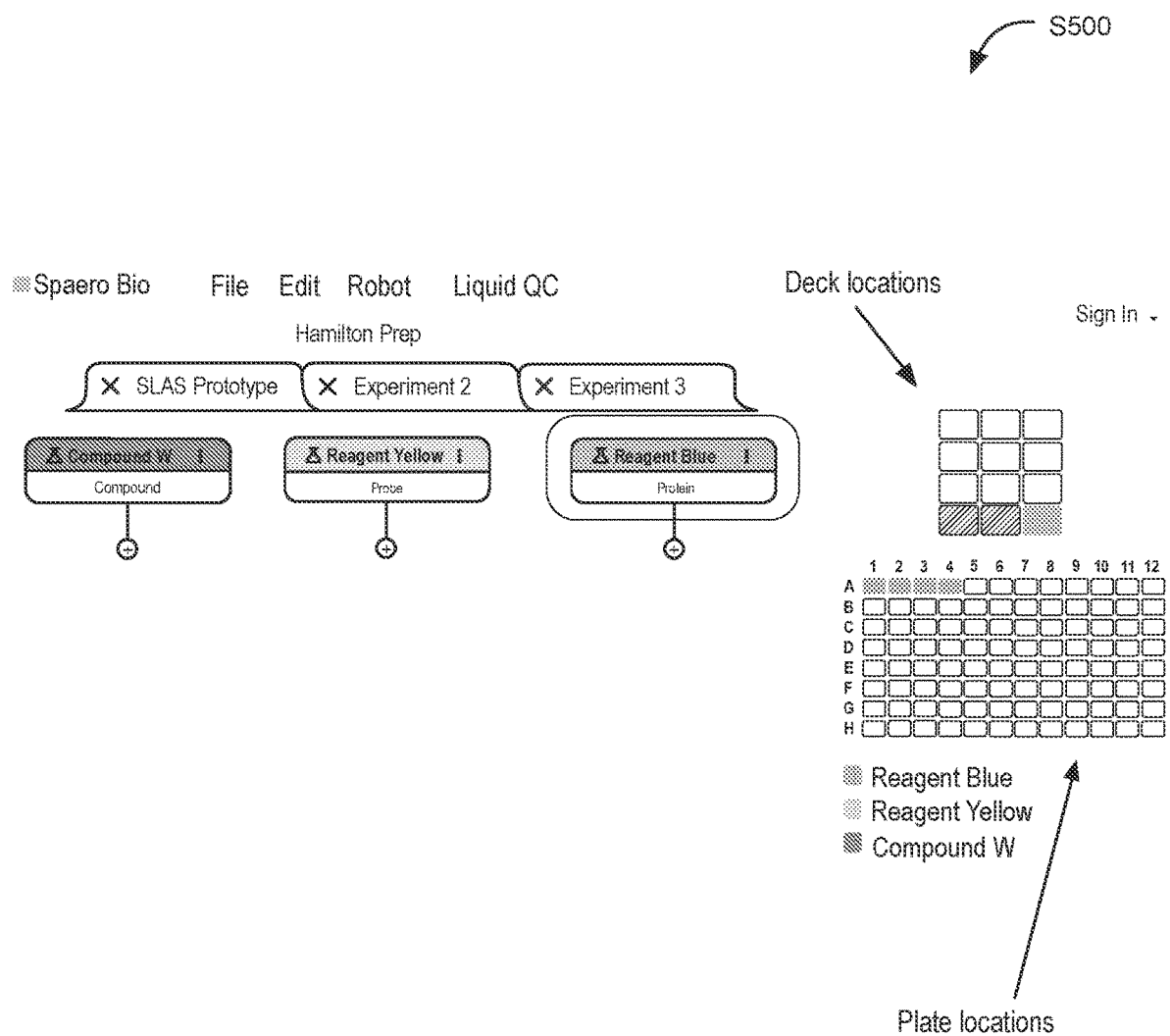
FIG. 15 is an illustrative example of a user interface for experiment setup.

In an example, all or portions of the computational representation parameters can be discretized or otherwise transformed (e.g., post-optimization, generating a transformed optimized computational representation). An example is shown in FIG. 6. In a specific example, transfer volumes are transformed (e.g., rounded) to integer values such that one or more resulting transformed computational representation parameter values have an associated error (e.g., a difference between the transformed values and original experimental constraints, a difference between the transformed values and the non-transformed values, etc.) less than a maximum error threshold. For example, the transfer volumes can be in decimal form (e.g., floating point representation), and transformed to integer form (e.g., integer representation), The maximum error threshold can be predetermined, user-defined, based on laboratory robot error (e.g., pipetting error, measurement error, etc.), based on experimental constraints, and/or otherwise determined. In an illustrative example where edge parameters correspond to a ratio of transfer volume from a first node to total volume at a second node, the optimization determines new parameter values (e.g., dilution factors between 0 and 1) for each edge. The computational representation can be collapsed by removing all edges with a value of 1 and merging the nodes on either side. For each edge, a common fraction (e.g., an integer valued fraction of the form a/b, such that the transfer volume and total volume are integers) can then be determined that approximates the parameter value. For example, the approximation can have an error below a maximum error threshold. In a first specific example, the common fraction can be selected as the fraction with the smallest denominator such that the approximation is below the threshold. In a second specific example, denominators can be selected to minimize the sum of the denominator's prime factors (e.g., to minimize dead volume of liquid). An example of a first computational representation pre-optimization and post-optimization are shown in FIG. 10A and FIG. 10B, respectively. An example of a first computational representation pre-optimization and post-optimization are shown in FIG. 11A and FIG. 11B, respectively. In an illustrative example, if 0.2 mL is transferred from well A to well C and 0.8 mL is transferred from well B to well C (so well C contains 1 mL) the edge from A to C=0.2/(0.2+0.8)=0.2, and the edge from B to C=0.8/(0.2+0.8)=0.8, which is converted to an integer-valued fraction of ⅘.

In a second variant, a two-stage optimization approach is used. In a first example, the first stage includes optimizing the computational representation geometry (e.g., the number of dilutions, placement of specific experiment operations in a series, etc.). In this example, the second stage can include, based on the computational representation geometry optimization, optimizing the specifications for individual nodes and/or edges (e.g., determining sample component concentrations and/or volumes). In a second example, the first stage includes partially or fully optimizing specifications of the nodes and edges of each sub-DAG within a unified DAG (e.g., including concentration and/or volume of reagent dilution steps). In this example, the second stage can include optimizing specifications of the nodes and edges of the unified DAG (e.g., where the final node specifications are prescribed based on S200).

S400 can optionally include optimizing any other specifications (e.g., laboratory robot specifications, deck specifications, experiment operation specifications, etc.). For example, laboratory robot specifications (e.g., pipette tips, etc.) can be selected during computational representation optimization (e.g., wherein optimized transfer volumes are constrained based on available pipette tips).

However, the computational representation can be otherwise optimized.

Optionally, the method can include determining an experiment setup S500, which can function to define an initial state of the laboratory robot system and experiment preparation (e.g., for a user to manually implement). S500 can be performed after S400, during S400 (e.g., where starting reagent compositions and/or deck locations are determined by the optimization), after a user selects a laboratory robotic system and/or any other experimental constraints, and/or at any other time. S500 can be performed automatically, manually specified, and/or otherwise determined. In a first example, the experiment setup includes container specifications (e.g., volume, type, etc.) and/or initial deck locations for each container required to execute the optimized experiment. In a second example, the experiment setup includes specifications for starting samples (e.g., composition, deck location, etc.). In a specific example, the experiment setup includes initial reagent concentrations and volumes for each starting container, and initial volumes of diluent (e.g., water) for each intermediate and final container. Dispensing the diluent prior to performing a dilution series can optionally minimizing pipette tip changes and reduce overall experiment time. In a third example, the experiment setup includes robot system specifications (e.g., which pipetting head to use of the available options specified in S100). In a fourth example, the experiment setup includes a mapping between nodes within the final computational representation and container locations and/or container types (e.g., well locations, deck subvolume locations, different vial volumes, etc.). In this example, different node branches can be mapped to different rows, different columns, different rows or columns depending on the branch length, randomly assigned, and/or otherwise mapped. In this example, adjacent nodes (e.g., in the same branch) are preferably mapped to adjacent wells (e.g., in the same row or column), but can alternatively be mapped to nonadjacent wells, randomly assigned, or otherwise determined. In this example, branches with common ancestry can be mapped to adjacent rows or columns, or be mapped to nonadjacent rows or columns. However, the setup can be otherwise determined.

In a first variant, determining the setup can include using an algorithm, rule, or set of heuristics. In a first example, the container volume for each sample (e.g., node) can be selected as the smallest available container that will fit the volume for that sample determined in S400. In a second example, the sample deck location can be calculated as the deck location that minimizes: pipette head travel, robot motion, and/or other transfer parameters. In a third example, the sample deck location can be calculated as the deck location that minimizes the number of containers located between each pair of containers associated with connected nodes (e.g., minimizing the number of containers the laboratory robot passes over during sample transfers to minimize a sample contamination). In a second variant, the experiment setup can be determined via optimization methods. In a first example, deck locations for samples (e.g., starting reagents, intermediate samples, final samples, etc.) can be optimized to minimize platform space. In a second example, the optimal pipetting head can be selected to minimize the number of robot actions (e.g., experiment operations). In a third variant, the experiment setup can be manually specified (e.g., a user inputs initial deck locations for reagents). However, the experiment setup can be otherwise determined.

The experiment setup can be automatically implemented (e.g., by the laboratory robot system, by another robot system, etc.) and/or implemented by a user. In an example, prompts are provided to a user to implement the determined experiment setup. In an illustrative example, a user prompt includes: insert 20 µL of Reagent A (concentration of 1M) into a 50 µL container in deck location well C2. However, the experiment setup can be otherwise implemented.

Determining robot instructions based on the optimized computational representation S600 can function to translate the optimized computational representation to actions for the laboratory robot system. S600 can be performed after S400, after S500, and/or at any other time. Preferably, the robot instructions are generic robot actions associated with an experiment operation (e.g., aspirate, move, dispense, mix, etc.). Additionally or alternatively, the robot instructions can include experiment operation parameter values (e.g., dispense rate, movement speed, instructions determined for a specific laboratory robot system, etc.). For example, the robot instructions can be aspiration instructions, transfer instructions, movement instructions, and/or any other experiment operation instructions. In an example, the robot instructions can be determined using graph traversal, including moving along each edge of the computational representation and determining (generic) robot instructions to perform the associated steps. In a first illustrative example, the instructions include: move to a container at deck location (0, 1), aspirate 1 µl from the container, move to a container at deck location (0, 2), and dispense 0.5 µl. In a second illustrative example, the instructions include: move to deck location (0, 0) and aspirate 0.5 µl from wells 1-8 using the 8 channel pipettor. However, the robot instructions can be otherwise determined.

Figure 4:
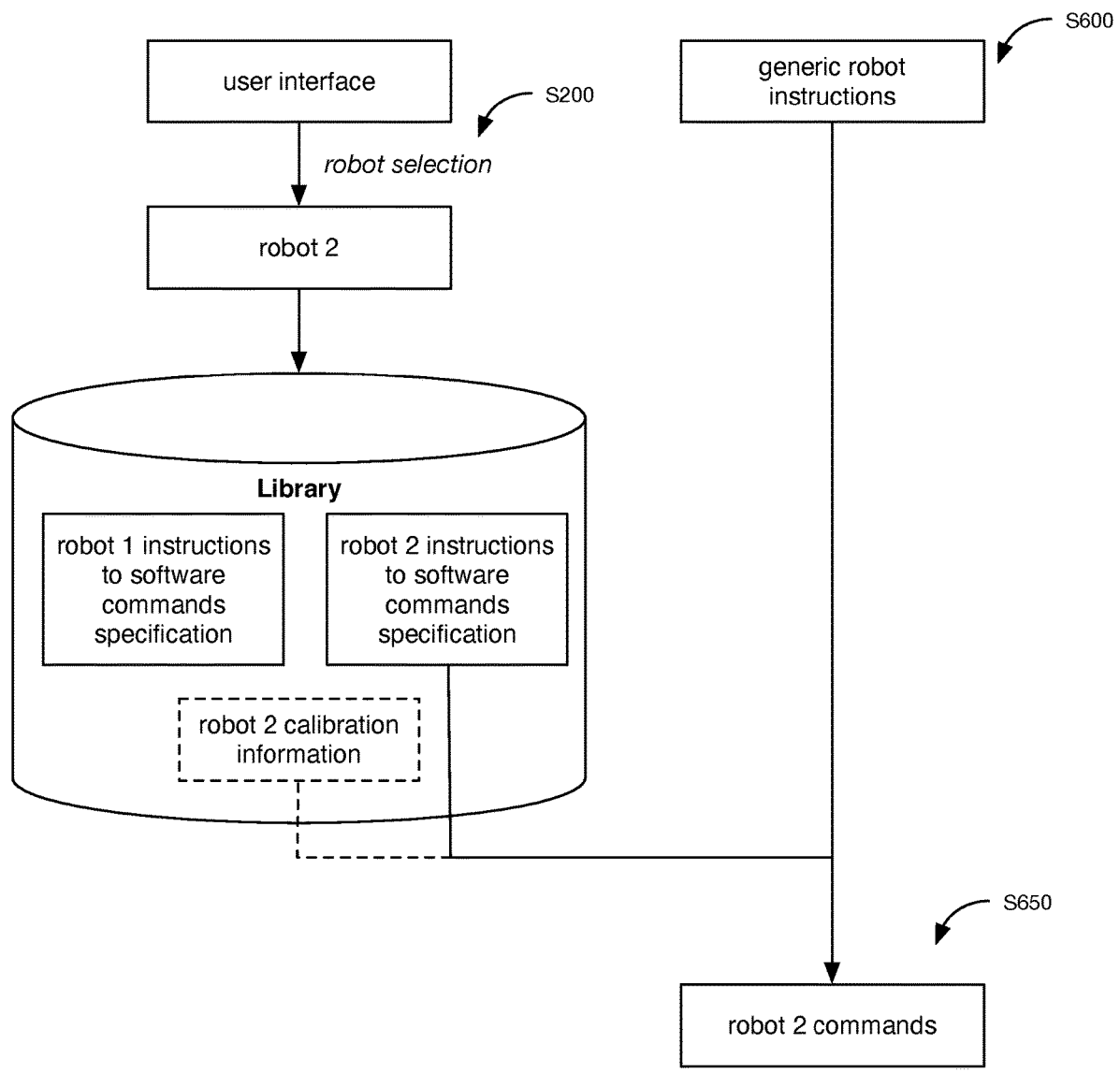
FIG. 4 depicts an example of translating robot instructions to software commands for a laboratory robot system.
Figure 5:
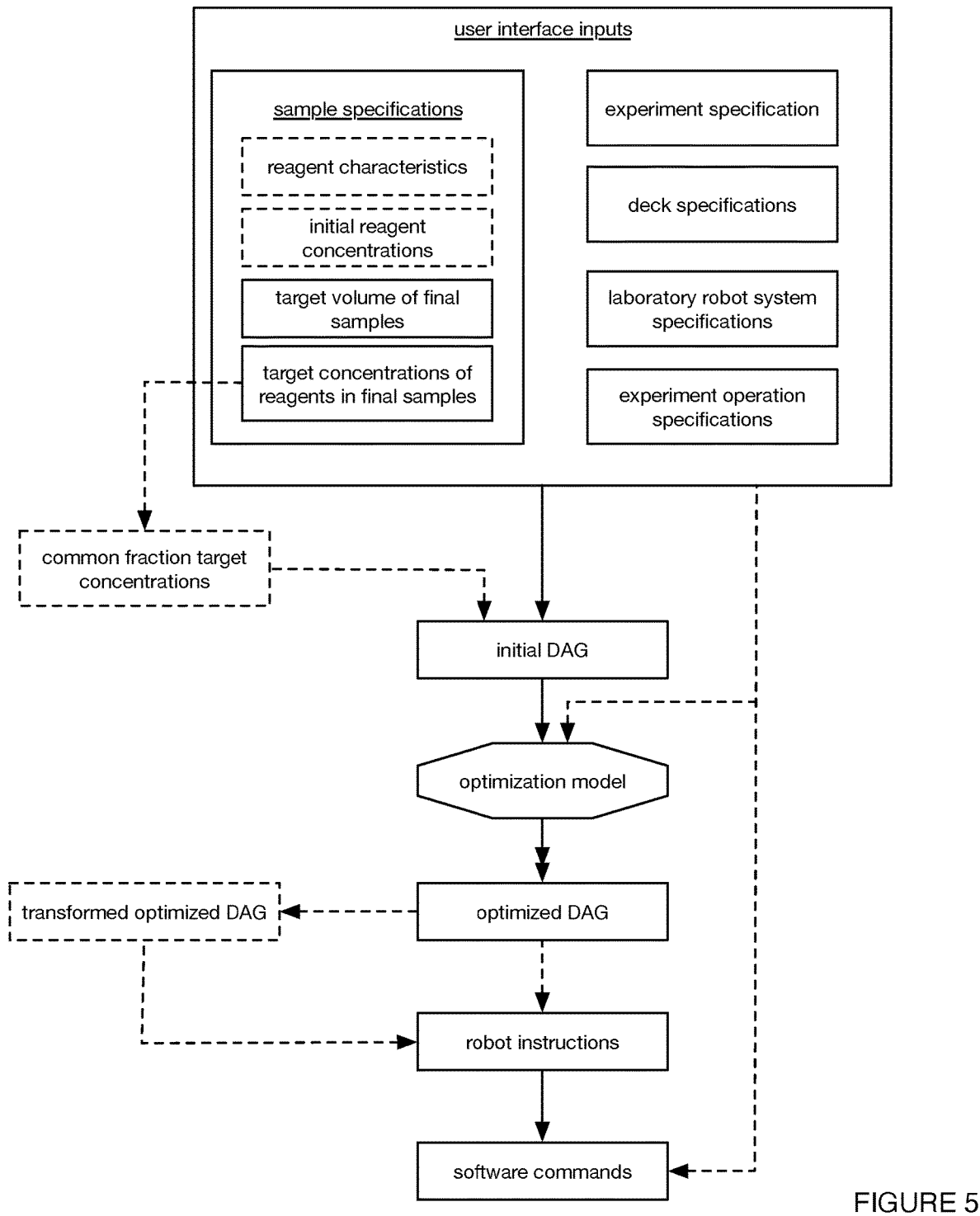
FIG. 5 depicts an example of generating software commands for a laboratory robot system.

The method can optionally include generating software commands for the laboratory robot S650, which can function to translate generic robot instructions (e.g., determined in S600) to software-specific commands for the laboratory robot system. In a first variant, the system includes a database of laboratory robot systems with a mapping between robot instructions and corresponding software system commands (e.g., API calls). In an example of the first variant, a user can select a specific laboratory robot system (e.g., including version number, software version, etc.) from a list of available systems. A stored library, set of translation modules, and/or set of templates can then be used to translate the determined robot instructions to software commands that will directly interface with the native laboratory robot software. An example is shown in FIG. 4. In a second variant, the robot instructions can be manually mapped (e.g., by the user) to the software system. Software commands and/or the robot instructions can optionally be determined based on measurements (e.g., calibration measurements), sample characteristics (e.g., physical characteristics), laboratory robot specifications, and/or other information; an example is shown in FIG. 5. For example, the software commands can include adjustments to the robot instructions (e.g., increasing or decreasing the aspiration rate) based on a sample viscosity and/or other characteristics. However, the robot software commands can be otherwise determined.

The method can optionally include executing the experiment S700, which can function to perform the optimized experiment (e.g., determined in S400), perform calibration procedures, and/or otherwise control the laboratory robot system. S700 can be performed after S650 (e.g., wherein S700 includes executing the software commands) and/or at any other time. S700 is preferably performed automatically or semi-automatically by the laboratory robot system, but can additionally or alternatively be performed or controlled by a user, by a central system, and/or any other system.

The experiment can include the experiment specified in S100, a modified version of the experiment determined in S100 (e.g., when optimizing the computational representation S400 modifies the experiment), preparation procedures required prior to executing the experiment, and/or any other protocol. Executing can include: executing system commands (e.g., commands from S650), providing a user with prompts (e.g., to implement experiment steps), and/or otherwise performing protocol steps. In specific examples, a user can provide feedback during and/or after S700 (e.g., indicating completion of a manual step, input a change in the experiment, etc.), which can then update the computational representation, robot instructions, and/or any other element.

However, the experiment can be otherwise executed.

The method can optionally include collecting measurements S750, which can function to collect experiment data, to collect calibration data, to provide feedback (e.g., feedback to the laboratory robot system, to the optimization model, to the liquid characterization model, to a user, etc.), to generate more accurate robot instructions and/or software system commands, and/or for other measurement use cases. S750 can be performed before all or parts of the method (e.g., calibrating the laboratory robot), during S700 (e.g., to collect experiment results, to provide feedback for a future experiment operation, to provide real-time feedback for a current experiment operation, etc.), and/or at any other time. S750 can be performed by the same laboratory robot system as used in S700 (e.g., using measurement systems of the laboratory robot system), by a different system (e.g., a separate measurement system), by a user, and/or otherwise performed.

In examples, measurements can be collected by performing an assay (e.g., fluorescence assay, liquid chromatography, mass spectrometry, etc.), measuring time (e.g., actual time in incubator, wash time, etc.), measuring volume (e.g., actual volume dispensed), measuring mass, and/or via any other data collection method. Measurements can optionally be stored in a database. In an example, an association (e.g., a mapping) between a node of the optimized computational representation and a container (e.g., the deck location of the container) is known and stored; this association can then be used to associate the robot-executed protocol (e.g., S700) with measurement results determined from the container's sample.

However, measurements can be otherwise collected.

Different subsystems and/or modules discussed above can be operated and controlled by the same or different entities. In the latter variants, different subsystems can communicate via: APIs (e.g., using API requests and responses, API keys, etc.), requests, and/or other communication channels.

Alternative embodiments implement the above methods and/or processing modules in non-transitory computer-readable media, storing computer-readable instructions that, when executed by a processing system, cause the processing system to perform the method(s) discussed herein. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUs, TPUS, microprocessors, or ASICs, but the instructions can alternatively or additionally be executed by any suitable dedicated hardware device.

Embodiments of the system and/or method can include every combination and permutation of the various system components and the various method processes, wherein one or more instances of the method and/or processes described herein can be performed asynchronously (e.g., sequentially), contemporaneously (e.g., concurrently, in parallel, etc.), or in any other suitable order by and/or using one or more instances of the systems, elements, and/or entities described herein. Components and/or processes of the following system and/or method can be used with, in addition to, in lieu of, or otherwise integrated with all or a portion of the systems and/or methods disclosed in the applications mentioned above, each of which are incorporated in their entirety by this reference.

As a person skilled in the art will recognize from the previous detailed description and from the figures and claims, modifications and changes can be made to the preferred embodiments of the invention without departing from the scope of this invention defined in the following claims.

I claim:

1. A system, comprising:
    a user interface configured to receive experiment constraints;
    a processor configured to:
        determine an initial graphical computational representation of the experiment based on the experiment constraints;
        optimize the initial graphical computational representation to determine an optimized graphical computational representation comprising a set of nodes connected by a set of edges, wherein each edge is associated with an experiment operation, wherein each node is associated with a composition for a sample; and
        determine software instructions based on the optimized graphical computational representation;
    a container carrier comprising physical containers, wherein each node is mapped to a physical container on the container carrier; and
    a liquid-handling robot system configured to execute the software instructions, wherein the executing the software instructions comprises, for each node: manufacturing the associated sample with a composition matching the associated sample composition, wherein the associated sample is located within the respective physical container.

2. The system of claim 1, wherein adjacent nodes in the graphical computational representation are mapped to physically adjacent containers on the container carrier.

3. The system of claim 1, wherein optimizing the initial graphical computational representation comprises minimizing a number of physical containers located between each pair of physical containers associated with connected nodes.

4. The system of claim 1, wherein each experiment operation comprises a dilution, wherein each edge is associated with a dilution factor, and wherein the software instructions comprise aspiration instructions for the robot determined based on the dilution factors.

5. A system, comprising:
    a user interface configured to receive experiment constraints;
    a processor configured to:
        determine an initial graphical computational representation of the experiment based on the experiment constraints;
        optimize the initial graphical computational representation to determine an optimized graphical computational representation comprising a set of nodes connected by a set of edges, wherein each edge is associated with an experiment operation, and wherein each node is associated with a composition for a sample, wherein the optimized graphical computational representation comprises a directed acyclic graph, wherein each composition comprises a concentration and a volume, wherein optimizing the initial graphical computational representation comprises determining the concentration and volume associated with each node of the optimized graphical computational representation; and
        determine software instructions based on the optimized graphical computational representation;
    a container carrier comprising physical containers, wherein each node is mapped to a physical container housing the sample associated with the node; and
    a liquid-handling robot system configured to execute the software instructions.

6. The system of claim 5, wherein the system further comprises a database configured to store at least one of: values associated with the optimized graphical computational representation or measurements acquired using the liquid-handling robot system.

7. The system of claim 5, wherein the processor is configured to optimize the initial graphical computational representation based on specifications associated with the liquid-handling robot system.

8. The system of claim 7, wherein the specifications comprise a minimum transfer volume and a maximum transfer volume.

9. The system of claim 5, wherein the processor is configured to determine the software instructions further based on a physical characteristic for each reagent used in the experiment.

10. The system of claim 5, wherein optimizing the initial graphical computational representation comprises selecting a pipette tip size for the liquid handling robot.

11. The system of claim 5, wherein optimizing the initial graphical computational representation comprises minimizing a number of edges of the optimized graphical computational representation.

12. A system, comprising:
    a user interface configured to receive experiment constraints;
    a processor configured to:
        determine an initial graphical computational representation of the experiment based on the experiment constraints;
        optimize the initial graphical computational representation to determine an optimized graphical computational representation comprising a set of nodes connected by a set of edges, wherein each edge is associated with an experiment operation, wherein each node is associated with a composition for a sample, wherein each experiment operation is associated with an aspiration error, wherein optimizing the initial graphical computational representation comprises minimizing an aggregate aspiration error; and determine software instructions based on the optimized graphical computational representation;

a container carrier comprising physical containers, wherein each node is mapped to a physical container housing the sample associated with the node; and a liquid-handling robot system configured to execute the software instructions.

* * * * *